(12) United States Patent
Irwin

(10) Patent No.: US 11,477,280 B1
(45) Date of Patent: Oct. 18, 2022

(54) INTEGRATING CLOUD STORAGE SERVICES

(71) Applicant: Pure Storage, Inc., Mountain View, CA (US)

(72) Inventor: Jonas Irwin, Livermore, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 15/660,052

(22) Filed: Jul. 26, 2017

(51) Int. Cl.
*H04L 67/1097* (2022.01)
*H04L 69/08* (2022.01)
*H04L 41/0806* (2022.01)
*H04L 67/51* (2022.01)
*H04L 67/1008* (2022.01)
*H04L 67/1023* (2022.01)

(52) U.S. Cl.
CPC ...... *H04L 67/1097* (2013.01); *H04L 41/0806* (2013.01); *H04L 67/51* (2022.05); *H04L 69/08* (2013.01); *H04L 67/1008* (2013.01); *H04L 67/1023* (2013.01)

(58) Field of Classification Search
CPC ... H04L 67/1097; H04L 67/16; H04L 69/008; H04L 41/0806
USPC ........ 709/203, 213, 217, 230, 238, 245, 246
See application file for complete search history.

(56) References Cited

U.S. PATENT DOCUMENTS

| | | | |
|---|---|---|---|
| 5,706,210 A | 1/1998 | Kumano et al. | |
| 5,727,158 A * | 3/1998 | Bouziane | G06F 17/30569 707/E17.006 |
| 5,799,200 A | 8/1998 | Brant et al. | |
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |

(Continued)

FOREIGN PATENT DOCUMENTS

EP 0725324 A2 8/1996
WO WO-2012/087648 A1 6/2012

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Michael Won

(57) ABSTRACT

Integrating cloud storage services includes: receiving, by a storage integration service, a request to perform a first data storage operation corresponding to first data; generating, by applying one or more functional operations to the first data, second data; generating, by applying one or more translation operations to the first data storage operation, one or more second data storage operations that correspond to the second data, wherein the one or more second data storage operations correspond to respective one or more cloud storage services; and issuing, by the storage integration service, the one or more second data storage operations to the corresponding one or more cloud storage services.

9 Claims, 24 Drawing Sheets

(56) References Cited

U.S. PATENT DOCUMENTS

| | | | |
|---|---|---|---|
| 7,107,389 B2 | 9/2006 | Inagaki et al. | |
| 7,146,521 B1 | 12/2006 | Nguyen | |
| 7,149,730 B2* | 12/2006 | Mullins | G06F 17/30607 |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B1 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,402,139 B2* | 3/2013 | Ferris | G06F 9/5055 709/224 |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,631,099 B2* | 1/2014 | Morgan | G06F 9/5088 709/203 |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,805,971 B1* | 8/2014 | Roth | G06F 9/5072 709/203 |
| 8,812,860 B1 | 8/2014 | Bray | |
| 8,819,452 B2* | 8/2014 | Gladwin | G06F 17/30067 380/217 |
| 8,850,546 B1 | 9/2014 | Field et al. | |
| 8,856,382 B2* | 10/2014 | Akolkar | G06F 9/5072 709/203 |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,330,105 B1* | 5/2016 | Duprey | G06F 17/30153 |
| 9,372,809 B2* | 6/2016 | Testardi | G06F 11/1453 |
| 9,411,562 B2* | 8/2016 | Venkata Naga Ravi | G06F 8/65 |
| 9,426,030 B1* | 8/2016 | Anerousis | H04L 41/0859 |
| 9,444,822 B1 | 9/2016 | Borowiec et al. | |
| 9,507,532 B1 | 11/2016 | Colgrove et al. | |
| 9,716,746 B2* | 7/2017 | Garg | H04L 67/10 |
| 9,792,633 B2* | 10/2017 | Bookstaff | G06F 17/30867 |
| 10,067,780 B2* | 9/2018 | Chang | H04L 67/10 |
| 10,178,173 B2* | 1/2019 | Kadowaki | G06F 3/0604 |
| 2002/0013802 A1 | 1/2002 | Mori et al. | |
| 2002/0103943 A1* | 8/2002 | Lo | H04L 29/06 710/2 |
| 2002/0156977 A1* | 10/2002 | Derrick | G06F 9/30174 711/118 |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2005/0243604 A1* | 11/2005 | Harken | G06F 8/51 365/185.22 |
| 2006/0015771 A1 | 1/2006 | Van Gundy et al. | |
| 2006/0111876 A1* | 5/2006 | Ichikawa | G06Q 10/06 702/189 |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0241726 A1* | 9/2010 | Wu | G06F 16/172 709/217 |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325199 A1* | 12/2010 | Park | G06F 17/30067 709/203 |
| 2010/0325345 A1 | 12/2010 | Ohno et al. | |
| 2010/0332754 A1 | 12/2010 | Lai et al. | |
| 2011/0016214 A1* | 1/2011 | Jackson | G06F 9/5044 709/226 |
| 2011/0022812 A1* | 1/2011 | van der Linden | G06F 9/5077 711/163 |
| 2011/0072290 A1 | 3/2011 | Davis et al. | |
| 2011/0099146 A1* | 4/2011 | McAlister | G06F 11/3006 707/634 |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2011/0178997 A1* | 7/2011 | Johnson | G06F 17/30091 707/694 |
| 2011/0231899 A1* | 9/2011 | Pulier | G06F 9/45558 726/1 |
| 2011/0246763 A1* | 10/2011 | Karnes | H04L 69/14 711/E12.001 |
| 2011/0276713 A1* | 11/2011 | Brand | H04L 69/04 709/232 |
| 2012/0023144 A1 | 1/2012 | Rub | |
| 2012/0054264 A1 | 3/2012 | Haugh et al. | |
| 2012/0060212 A1* | 3/2012 | Inoue | G06F 9/5038 726/14 |
| 2012/0079318 A1 | 3/2012 | Colgrove et al. | |
| 2012/0110055 A1* | 5/2012 | Van Biljon | G06Q 30/04 709/201 |
| 2012/0124211 A1* | 5/2012 | Kampas | G06F 9/50 709/226 |
| 2012/0131253 A1 | 5/2012 | McKnight et al. | |
| 2012/0173822 A1* | 7/2012 | Testardi | G06F 11/1453 711/135 |
| 2012/0185913 A1* | 7/2012 | Martinez | G06F 9/455 726/1 |
| 2012/0287785 A1* | 11/2012 | Kamble | H04L 49/356 370/230.1 |
| 2012/0303736 A1* | 11/2012 | Novotny | H04L 67/1097 709/213 |
| 2012/0303919 A1 | 11/2012 | Hu et al. | |
| 2012/0311000 A1 | 12/2012 | Post et al. | |

(56) References Cited

U.S. PATENT DOCUMENTS

| | | | |
|---|---|---|---|
| 2012/0311291 A1* | 12/2012 | Fiske | G06F 3/0608 711/170 |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0067090 A1* | 3/2013 | Batrouni | H04L 67/1097 709/226 |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0204849 A1* | 8/2013 | Chacko | G06F 3/0604 707/692 |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2013/0339298 A1* | 12/2013 | Muller | G06F 11/1464 707/640 |
| 2013/0339423 A1* | 12/2013 | Degtiarov | G06F 9/5072 709/203 |
| 2014/0006354 A1* | 1/2014 | Parkison | G06F 3/067 707/649 |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0108263 A1* | 4/2014 | Ortiz | G06Q 20/3278 705/71 |
| 2014/0130119 A1* | 5/2014 | Goldschlag | H04L 63/101 726/1 |
| 2014/0143422 A1* | 5/2014 | Joseph | G06F 9/5072 709/226 |
| 2014/0149794 A1* | 5/2014 | Shetty | H04L 67/1095 714/20 |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0067171 A1* | 3/2015 | Yum | G06F 9/5072 709/226 |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0227602 A1* | 8/2015 | Ram | G06F 16/2365 707/634 |
| 2015/0263980 A1* | 9/2015 | Kasturi | H04L 41/5009 709/226 |
| 2015/0271450 A1* | 9/2015 | van Coppenolle | H04N 21/42623 725/31 |
| 2015/0347548 A1* | 12/2015 | Mortensen | G06F 11/14 707/618 |
| 2015/0378888 A1 | 12/2015 | Zhang et al. | |
| 2016/0085685 A1* | 3/2016 | Topp | G06F 12/1081 711/207 |
| 2016/0085772 A1* | 3/2016 | Vermeulen | G06F 17/30289 707/615 |
| 2016/0094483 A1* | 3/2016 | Johnston | H04L 47/827 709/226 |
| 2016/0098323 A1 | 4/2016 | Mutha et al. | |
| 2016/0099844 A1* | 4/2016 | Colgrove | G06F 3/0484 715/736 |
| 2016/0099888 A1* | 4/2016 | Dunbar | H04L 67/1008 709/226 |
| 2016/0142485 A1* | 5/2016 | Mitkar | G06F 16/128 707/681 |
| 2016/0314162 A1* | 10/2016 | Tarta | G06F 17/30359 |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2016/0359955 A1* | 12/2016 | Gill | G06F 9/45558 |
| 2017/0011069 A1* | 1/2017 | Davidov | G06F 3/0605 |
| 2017/0060918 A1* | 3/2017 | Iyer | G06F 16/185 |
| 2017/0104755 A1* | 4/2017 | Arregoces | H04L 63/10 |
| 2017/0123663 A1* | 5/2017 | Panasko | G06F 3/0659 |
| 2017/0168903 A1* | 6/2017 | Dornemann | G06F 11/1469 |
| 2017/0185327 A1* | 6/2017 | Powell | G06F 3/0619 |
| 2017/0193003 A1* | 7/2017 | Vijayan | G06F 11/1662 |
| 2017/0201430 A1* | 7/2017 | Finkelstein | H04L 41/5025 |
| 2017/0262347 A1* | 9/2017 | Dornemann | G06F 11/1464 |
| 2017/0262350 A1* | 9/2017 | Dornemann | G06F 11/1469 |
| 2017/0272209 A1* | 9/2017 | Yanovsky | G06F 3/0619 |
| 2017/0286110 A1* | 10/2017 | Agron | G06F 9/3016 |
| 2017/0329677 A1* | 11/2017 | Crofton | G06F 16/2455 |
| 2017/0331880 A1* | 11/2017 | Crofton | H04L 67/06 |
| 2020/0201827 A1* | 6/2020 | Chacko | G06F 21/6218 |
| 2020/0351345 A1* | 11/2020 | Bansod | G06F 11/1469 |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dietzip file format*, GitHub.com (online), accessed Jul. 28, 2015, 1 page, URL: github.com/fidlej/idzip.

(56) References Cited

OTHER PUBLICATIONS

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

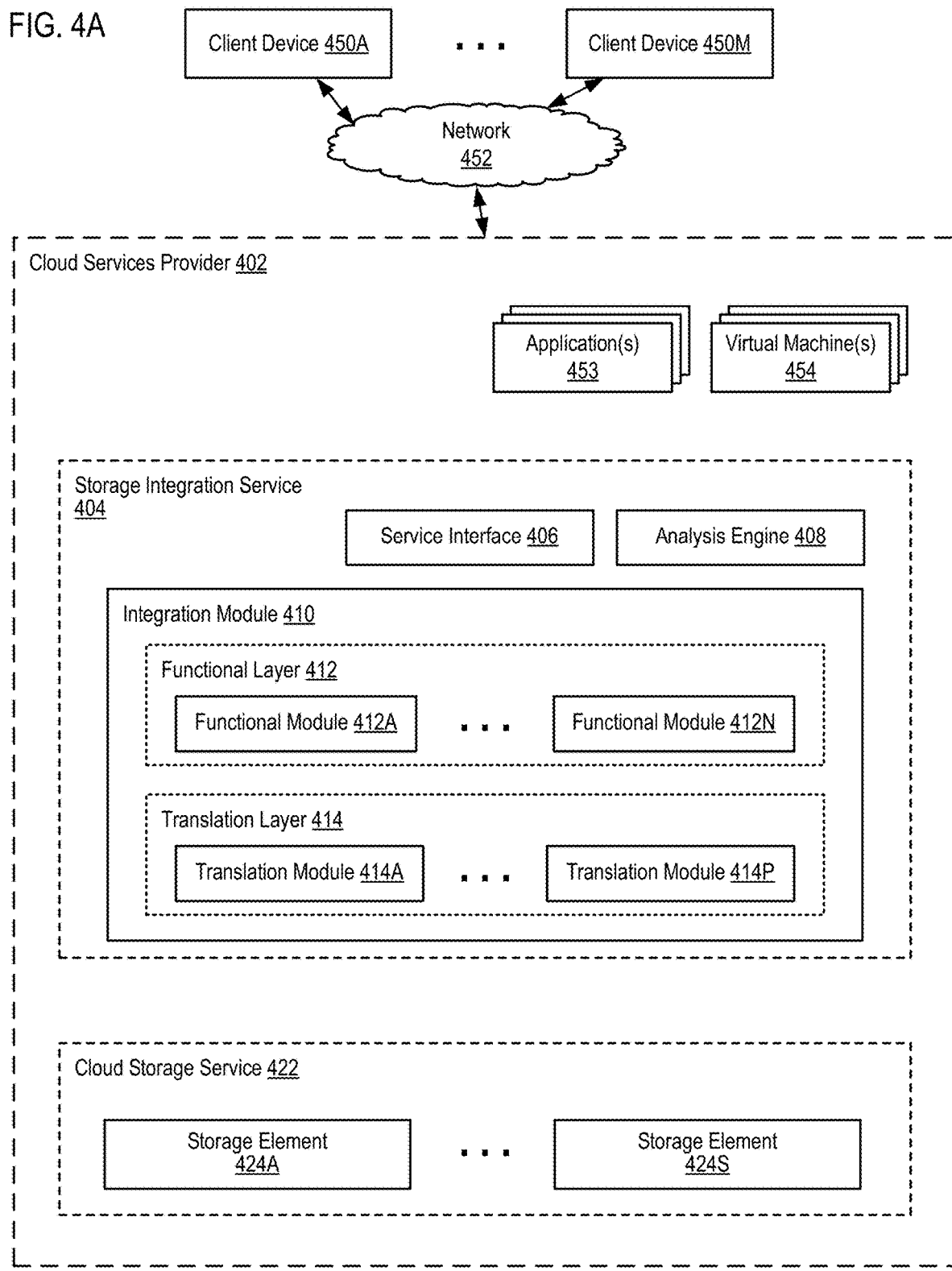

Storage Integration Service 404

Receive A Request To Perform A First Data Storage Operation Corresponding To First Data 602

Generate, By Applying One Or More Functional Operations To The First Data, Second Data 604

Generate, By Applying One Or More Translation Operations To The First Data Storage Operation, One Or More Second Data Storage Operations That Correspond To The Second Data, Where The One Or More Second Data Storage Operations Correspond To Respective One Or More Cloud Storage Services 606

Issue The One Or More Second Data Storage Operations To The Corresponding One Or More Cloud Storage Services 608

Migrate Data Stored In A First Cloud Storage Service Of The One Or More Cloud Storage Services To A Second Cloud Storage Service Of The One Or More Cloud Storage Services 1002

Relinquish The Data In The First Cloud Storage Service 1004

FIG. 10

Storage Integration Service 404

Receive A Request To Perform A First Data Storage Operation Corresponding To First Data 602

Generate, By Applying One Or More Functional Operations To The First Data, Second Data 604

Generate, By Applying One Or More Translation Operations To The First Data Storage Operation, One Or More Second Data Storage Operations That Correspond To The Second Data, Where The One Or More Second Data Storage Operations Correspond To Respective One Or More Cloud Storage Services 606

Issue The One Or More Second Data Storage Operations To The Corresponding One Or More Cloud Storage Services 608

Provision A First Amount Of Storage Capacity From A First Cloud Storage Service Of The One Or More Cloud Storage Services 1102

Providing A Second Amount Of Storage Capacity To Users Of The Storage Integration Service, Where The Second Amount Of Storage Capacity Is Larger Than The First Amount Of Storage Capacity Provisioned From The First Cloud Storage Service 1104

FIG. 11

Storage Integration Service 404

Receive A Request To Perform A First Data Storage Operation Corresponding To First Data 602

Generate, By Applying One Or More Functional Operations To The First Data, Second Data 604

Generate, By Applying One Or More Translation Operations To The First Data Storage Operation, One Or More Second Data Storage Operations That Correspond To The Second Data, Where The One Or More Second Data Storage Operations Correspond To Respective One Or More Cloud Storage Services 606

Issue The One Or More Second Data Storage Operations To The Corresponding One Or More Cloud Storage Services 608

Receive, By The Storage Integration Service, A Request To Perform A Read Operation Corresponding To The First Data 1202

Generate, By Applying One Or More Translation Operations To The Read Operation, One Or More Read Operations That Correspond To The Respective One Or More Cloud Storage Services 1204

Read Operation(s) 1252

Issue, By The Storage Integration Service, The One Or More Read Operations To The Corresponding One Or More Cloud Storage Services 1206

Read Operation(s) 1252

Read Results 1256

Provide, Responsive To The Read Operation, Data Based On One Or More Results From The One Or More Read Operations Issued To The One Or More Cloud Storage Services 1208

Data 1258

FIG. 12

INTEGRATING CLOUD STORAGE SERVICES

BRIEF DESCRIPTION OF DRAWINGS

FIG. 4A sets forth a diagram of a storage integration service in accordance with some embodiments of the present disclosure.

FIG. 10 sets forth a flow chart illustrating an additional example method of integrating cloud storage services according to some embodiments of the present disclosure.

FIG. 11 sets forth a flow chart illustrating an additional example method of integrating cloud storage services according to some embodiments of the present disclosure.

FIG. 12 sets forth a flow chart illustrating an additional example method of integrating cloud storage services according to some embodiments of the present disclosure.

DESCRIPTION OF EMBODIMENTS

Figure 1A:
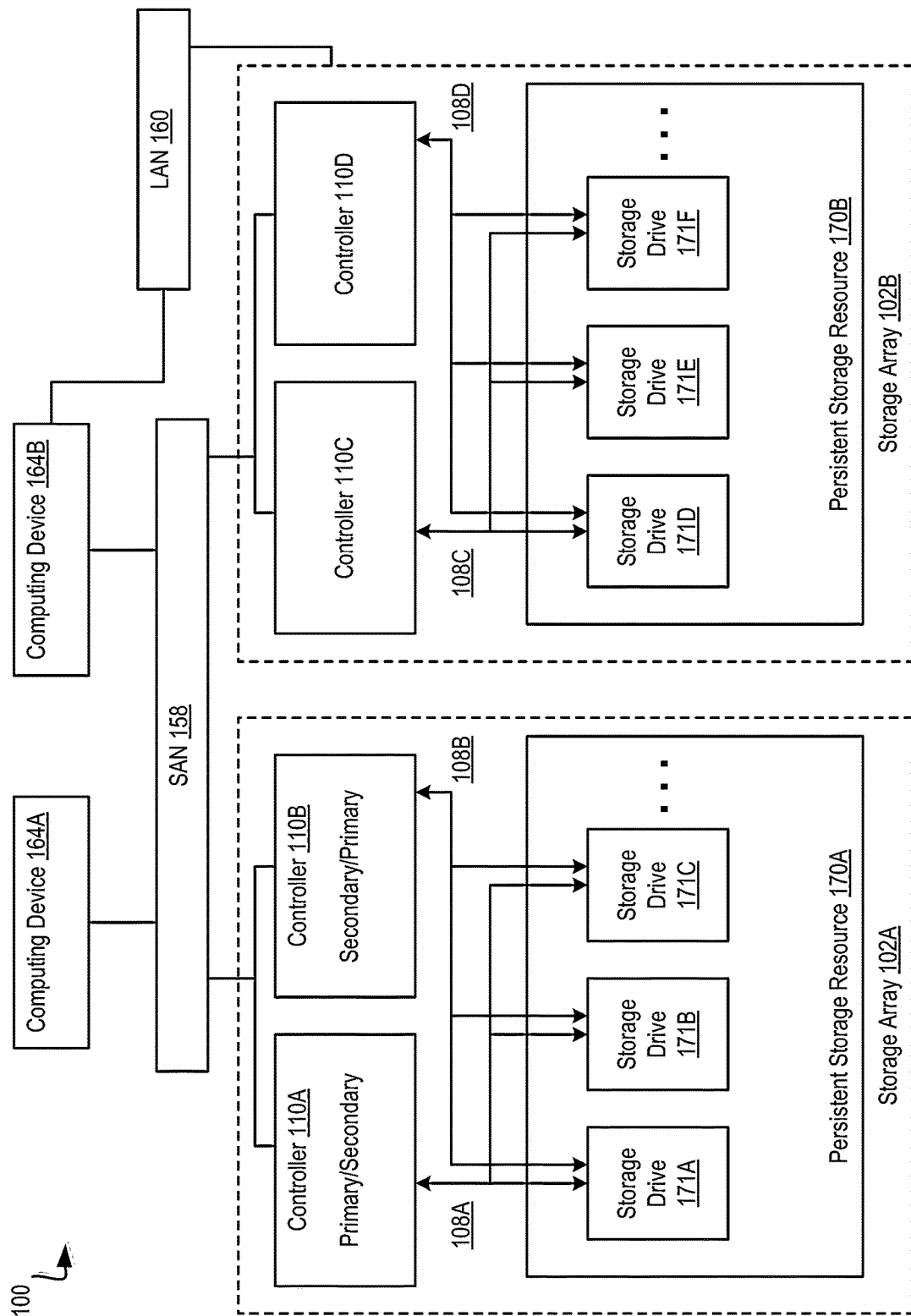
FIG. 1A illustrates a first example system for data storage in accordance with some implementations.

Example methods, apparatus, and products for integrating cloud storage services in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol (IF), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110 may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110 may include, for example, a data communications adapter configured to support communications via the SAN 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110 may be configured to utilize the NVRAM devices as a quickly accessible buffer for data destined to be written to the storage drives 171A-F. Latency for write requests using NVRAM devices as a buffer may be improved relative to a system in which a storage array controller 110 writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110 may be configured for offloading device management responsibilities from storage drive 171A-F in storage array 102A-B. For example, storage array controllers 110 may manage control information that may describe the state of one or more memory blocks in the storage drives 171A-F. The control information may indicate, for example, that a particular memory block has failed and should no longer be written to, that a particular memory block contains boot code for a storage array controller 110, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110. The selected memory blocks may be tagged with an identifier indicating that the selected memory block contains control information. The identifier may be utilized by the storage array controllers 110 in conjunction with storage drives 171A-F to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110 may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110 querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110 that includes the location of control information for the storage drive 171A-F. Responsive to receiving the response message, storage array controllers 110 may issue a request to read data stored at the address associated with the location of control information for the storage drives 171A-F.

In other implementations, the storage array controllers 110 may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110. For example, storage array 102A may include storage array controllers 110A and storage array controllers 110B. At a given instance, a single storage array controller 110 (e.g., storage array controller 110A) of a storage system 100 may be designated with primary status (also referred to as "primary controller" herein), and other storage array controllers 110 (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110 may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110 are communicatively coupled, via a midplane (not shown), to one or more storage drives 171A-F and to one or more NVRAM devices (not shown) that are included as part of a storage array 102A-B. The storage array controllers 110 may be coupled to the midplane via one or more data communications links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
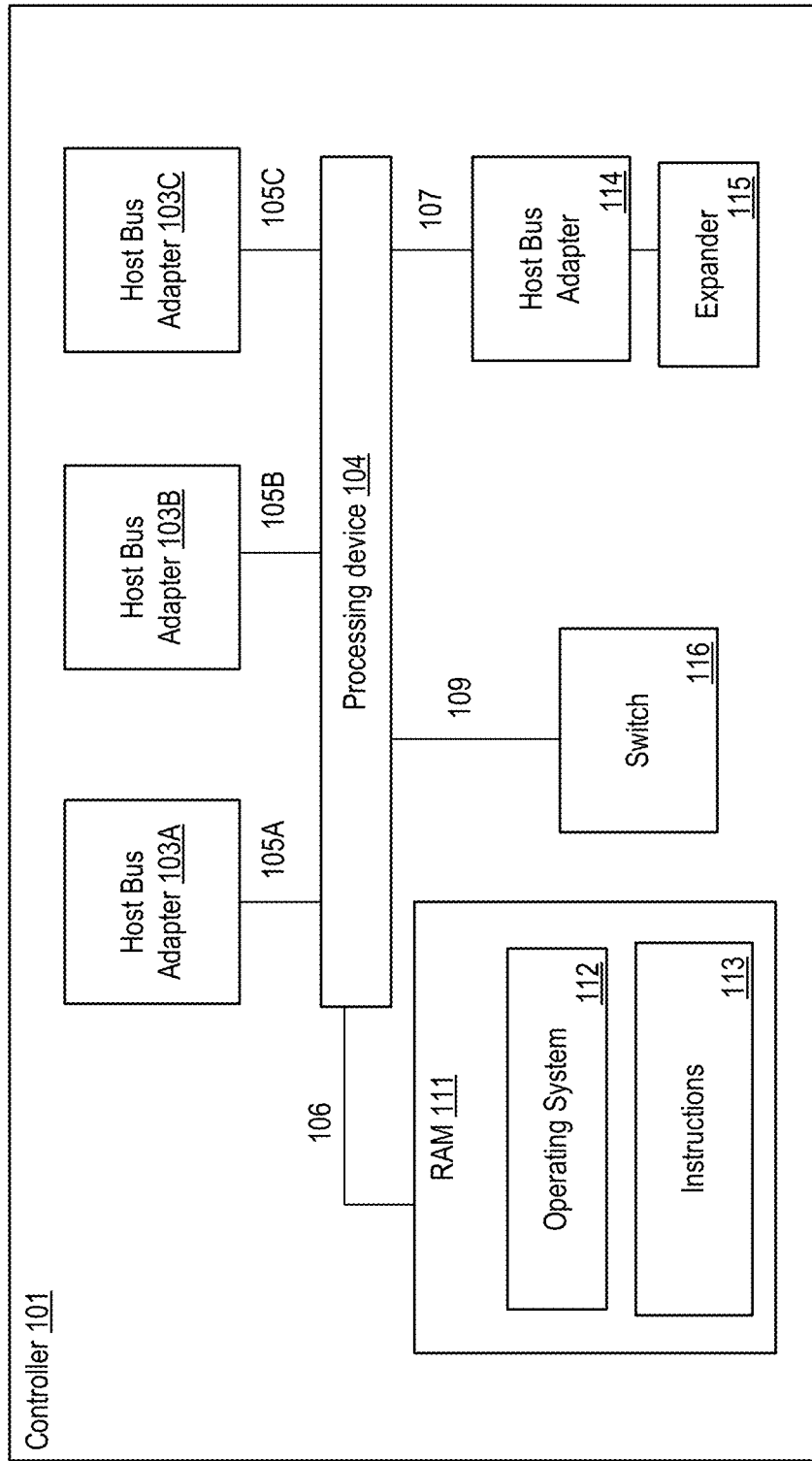
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110 described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
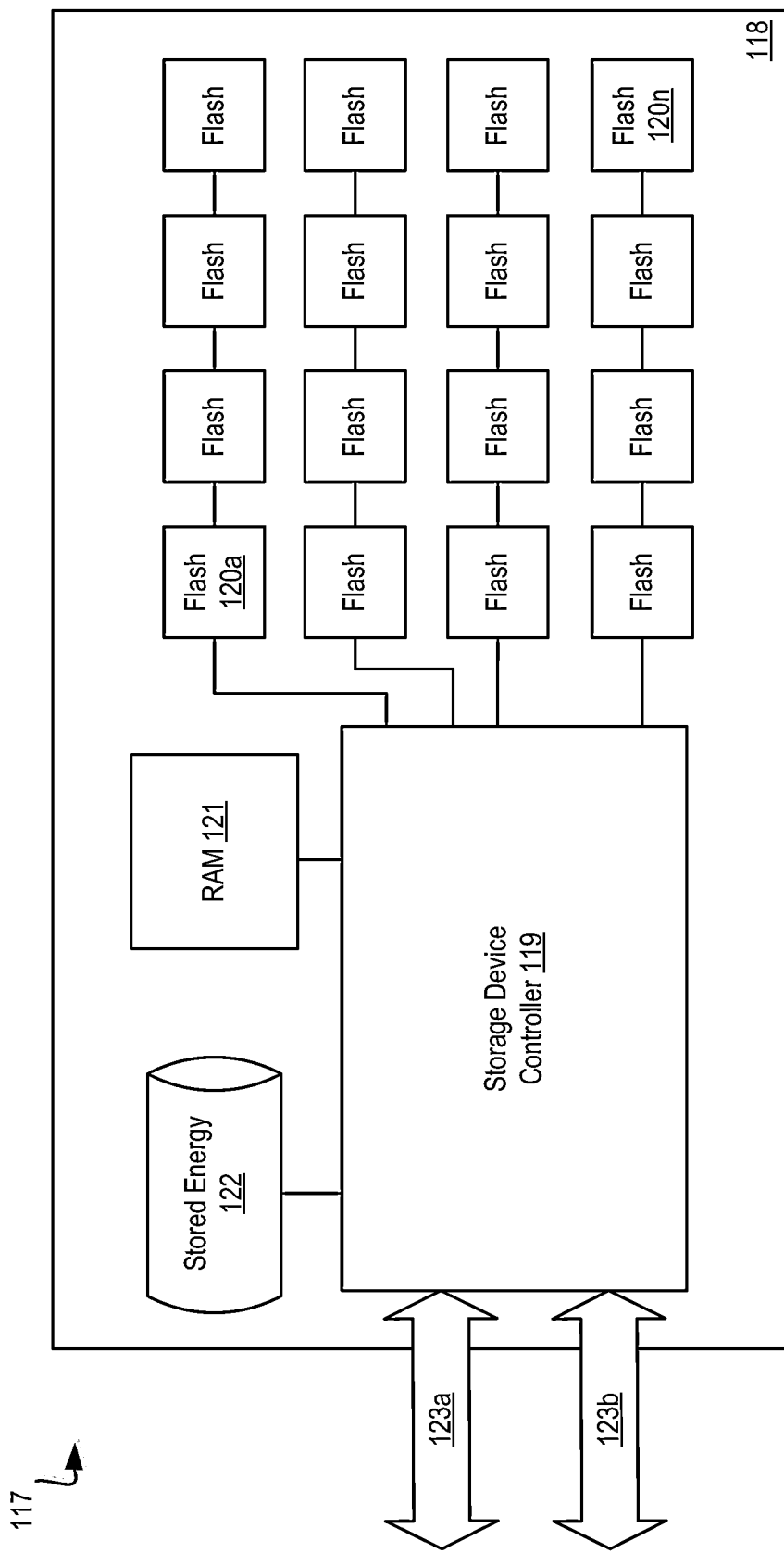
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119 may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119 as an addressable collection of Flash pages, erase blocks, and/or control elements sufficient to allow the storage device controller 119 to program and retrieve various aspects of the Flash. In one embodiment, storage device controller 119 may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119 or multiple storage device controllers. The RAM 121 may be utilized for other purposes as well, such as temporary program memory for a processing device (e.g., a CPU) in the storage device controller 119.

In one embodiment, system 119 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119 may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119 from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119 may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119 may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119 and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
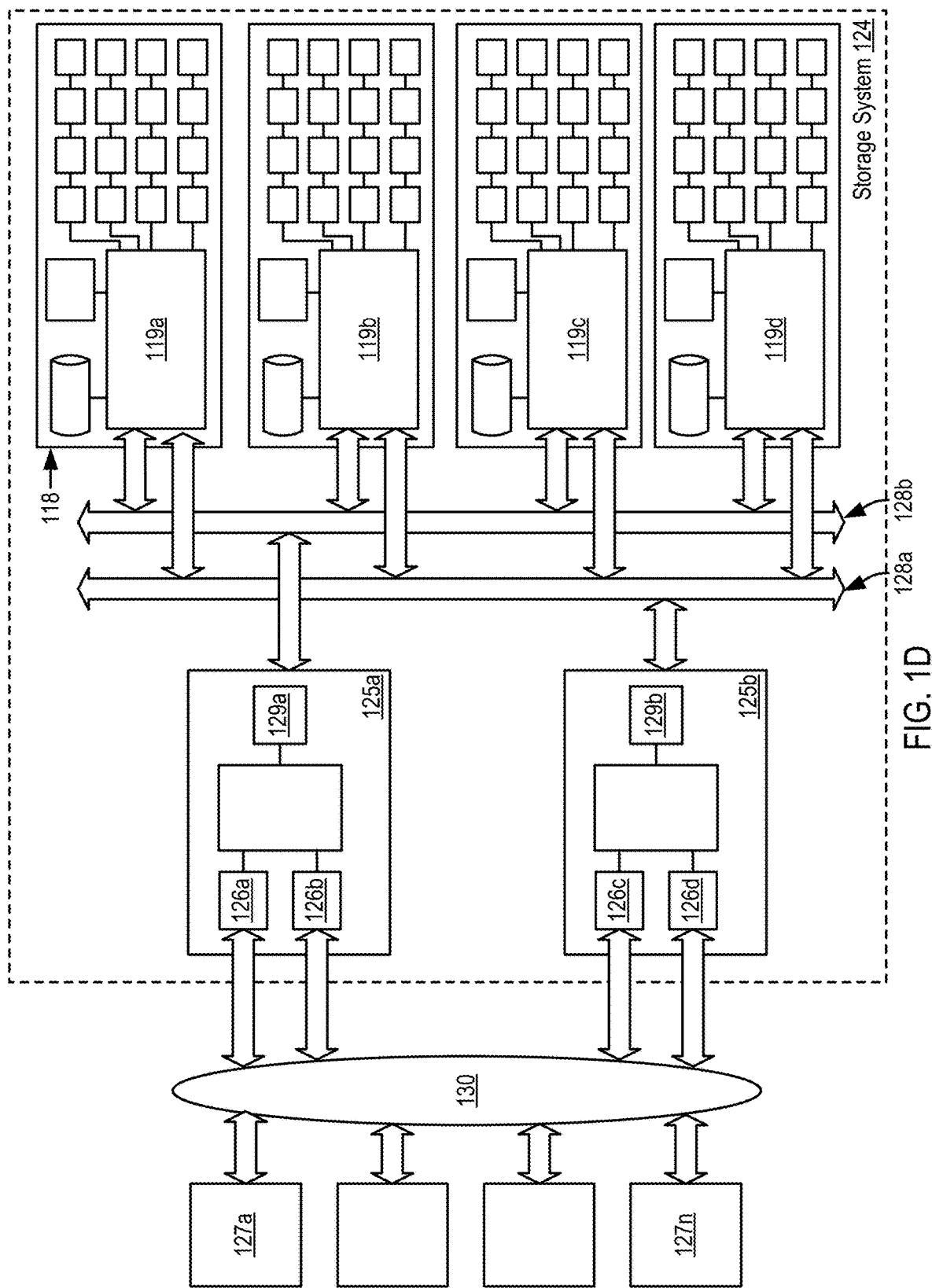
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119 may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
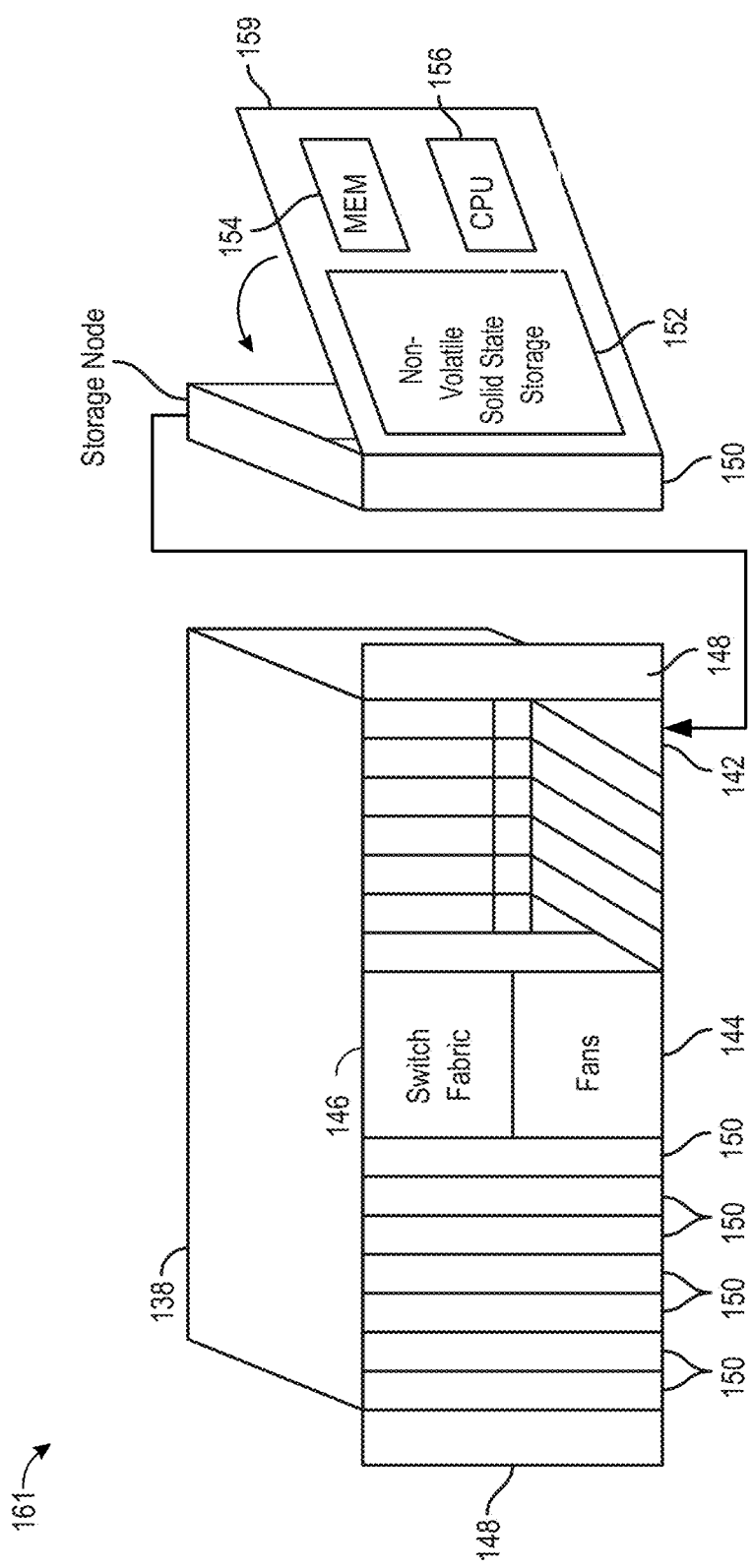
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
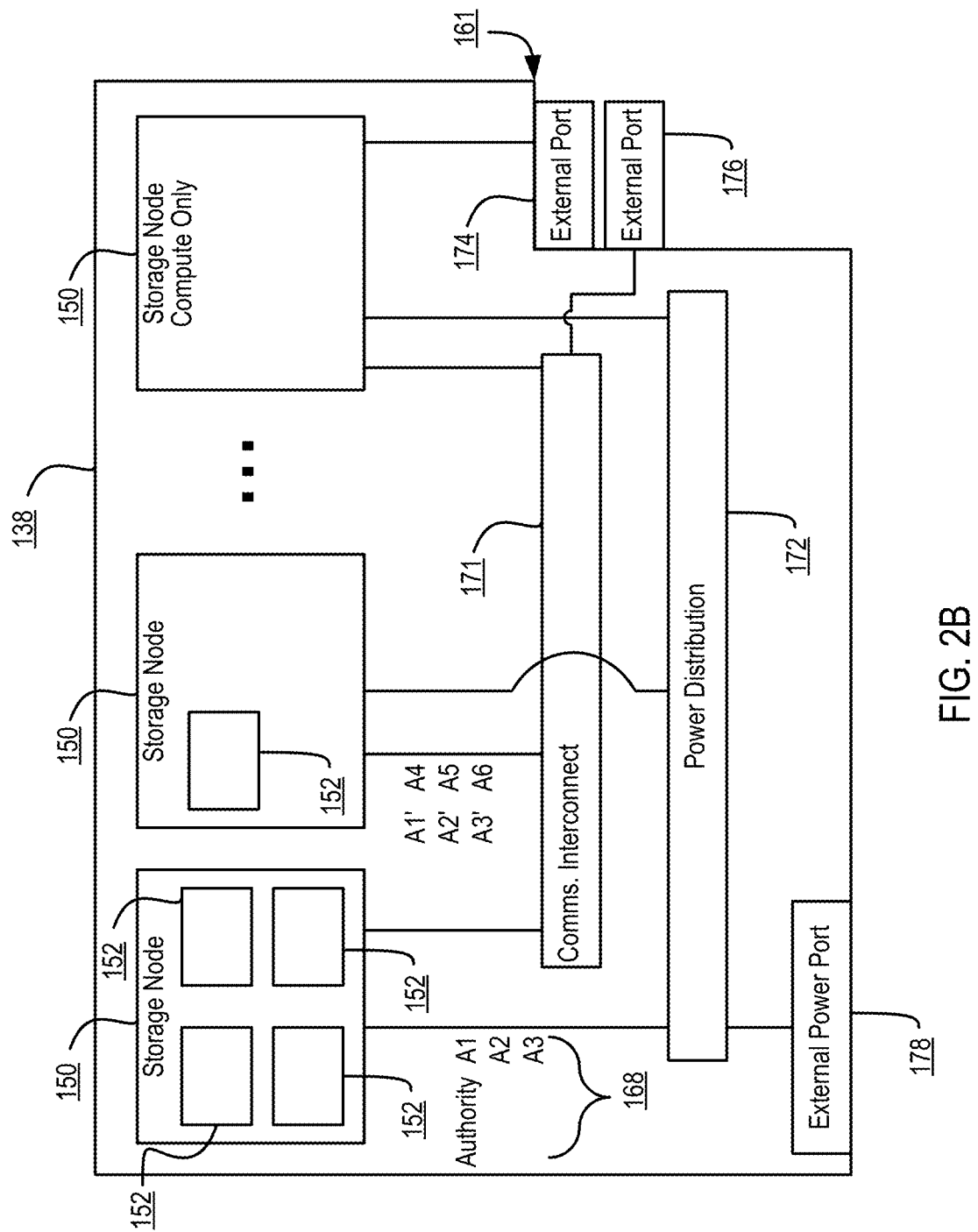
FIG. 2B is a block diagram showing an interconnect switch coupling multiple storage nodes in accordance with some embodiments.

FIG. 2B is a block diagram showing a communications interconnect 171 and power distribution bus 172 coupling multiple storage nodes 150. Referring back to FIG. 2A, the communications interconnect 171 can be included in or implemented with the switch fabric 146 in some embodiments. Where multiple storage clusters 161 occupy a rack, the communications interconnect 171 can be included in or implemented with a top of rack switch, in some embodiments. As illustrated in FIG. 2B, storage cluster 161 is enclosed within a single chassis 138. External port 176 is coupled to storage nodes 150 through communications interconnect 171, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Modes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
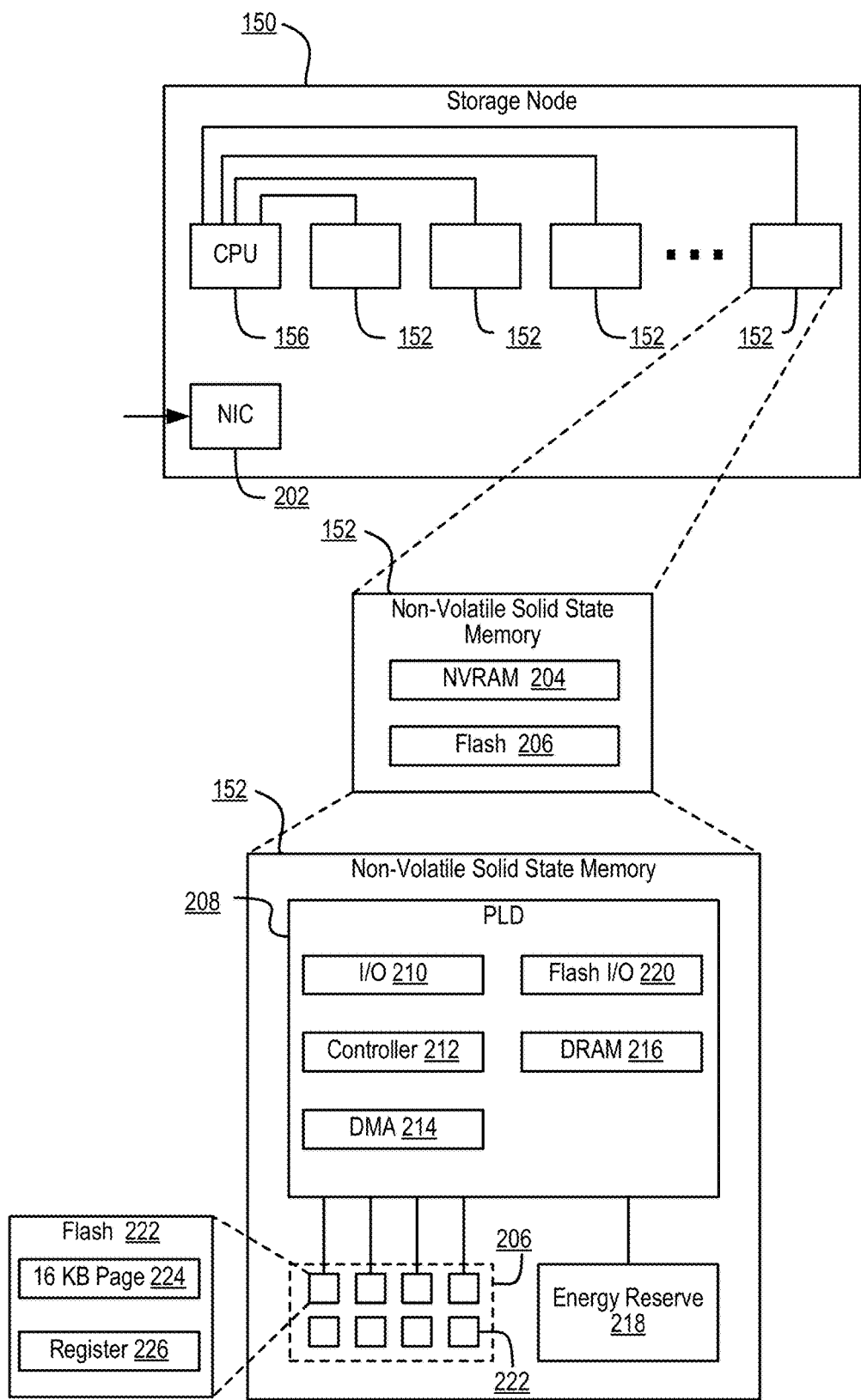
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
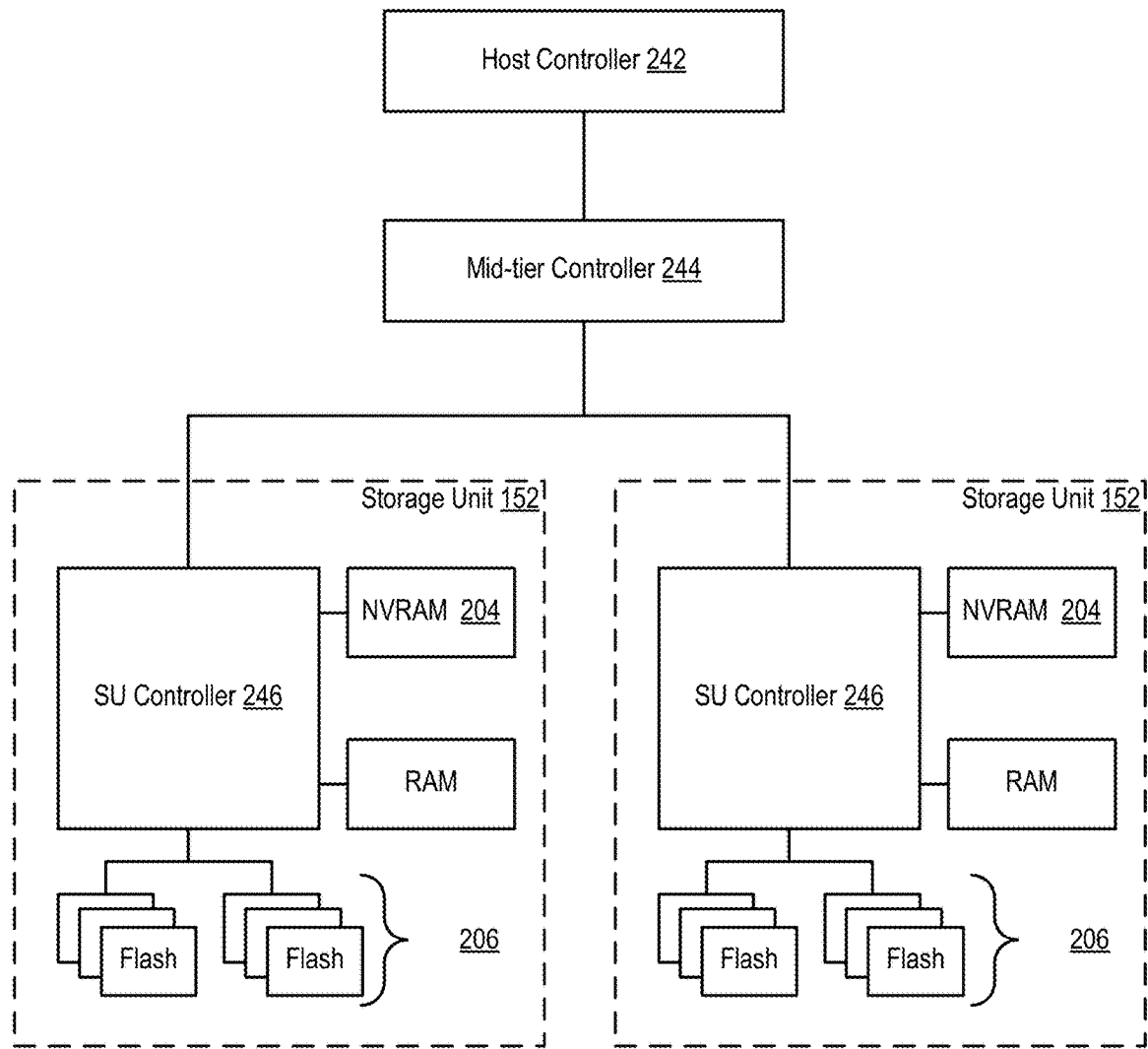
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
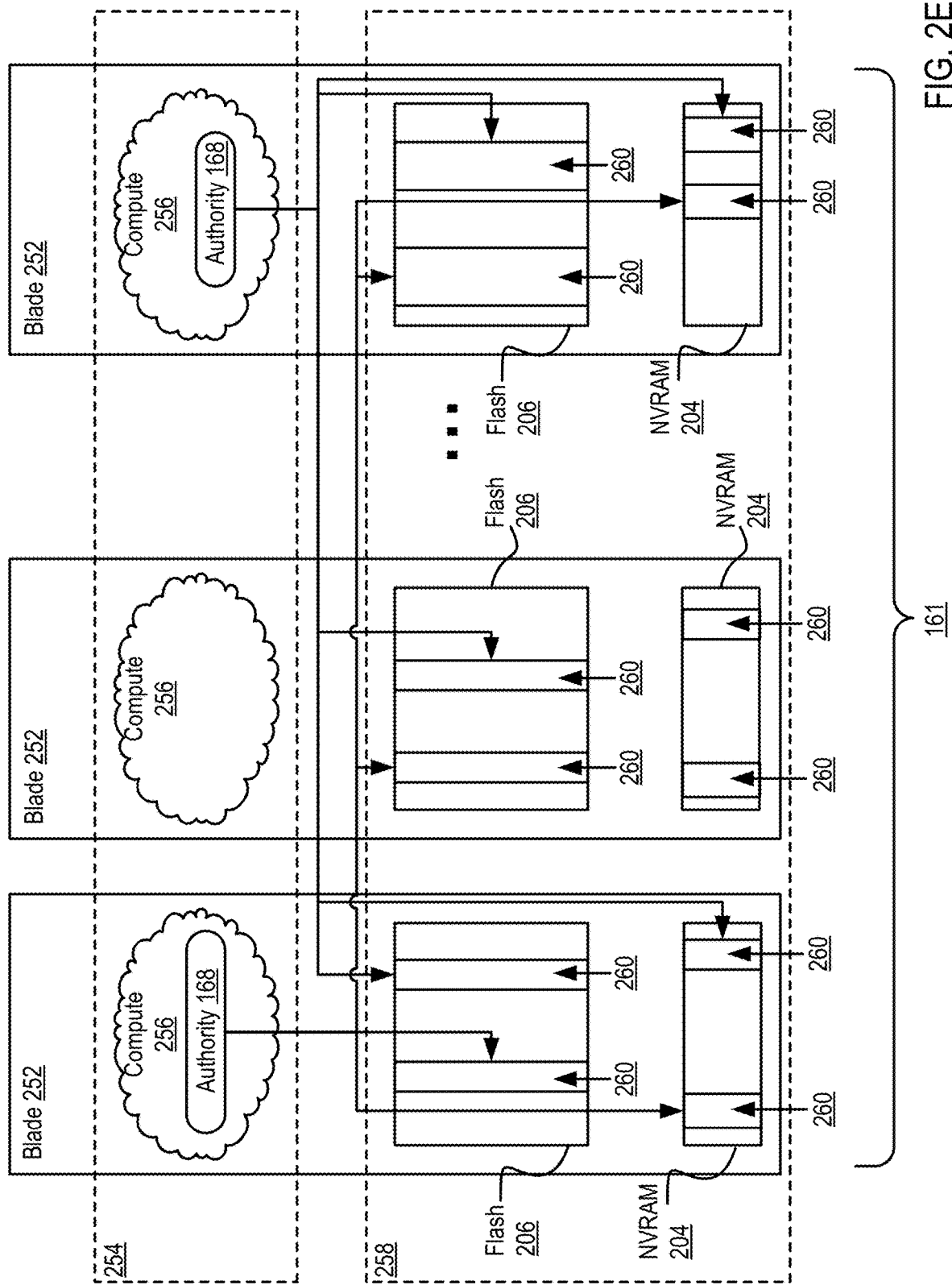
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
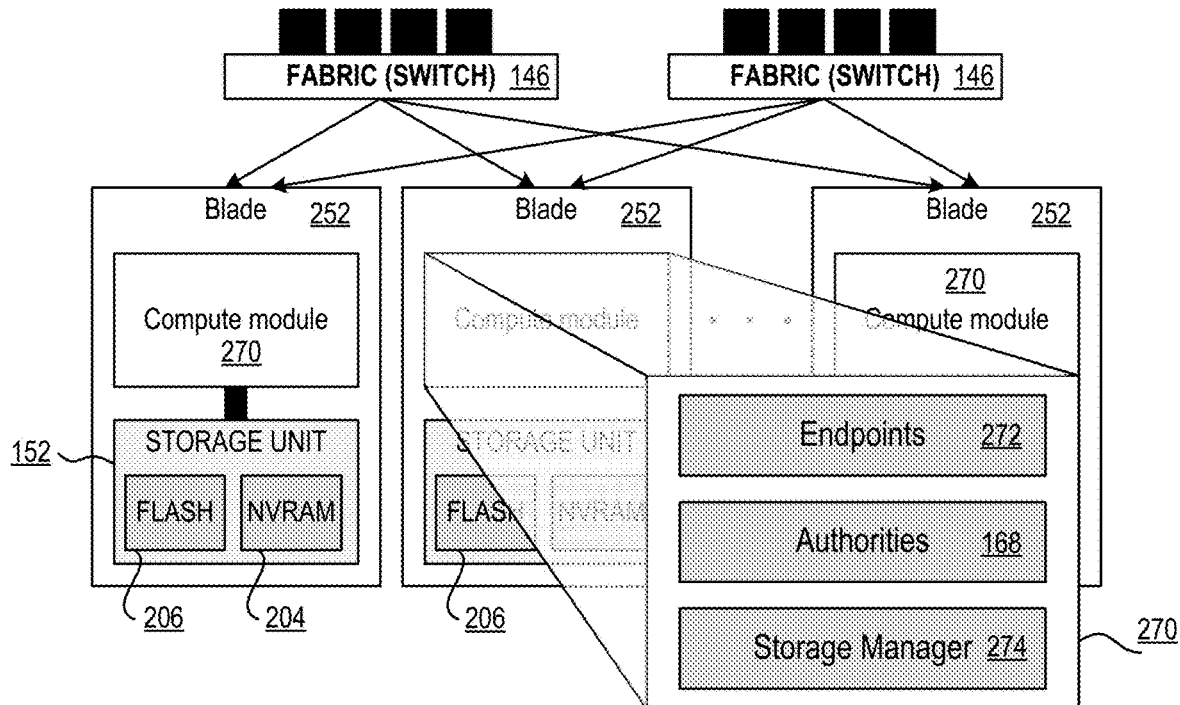
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
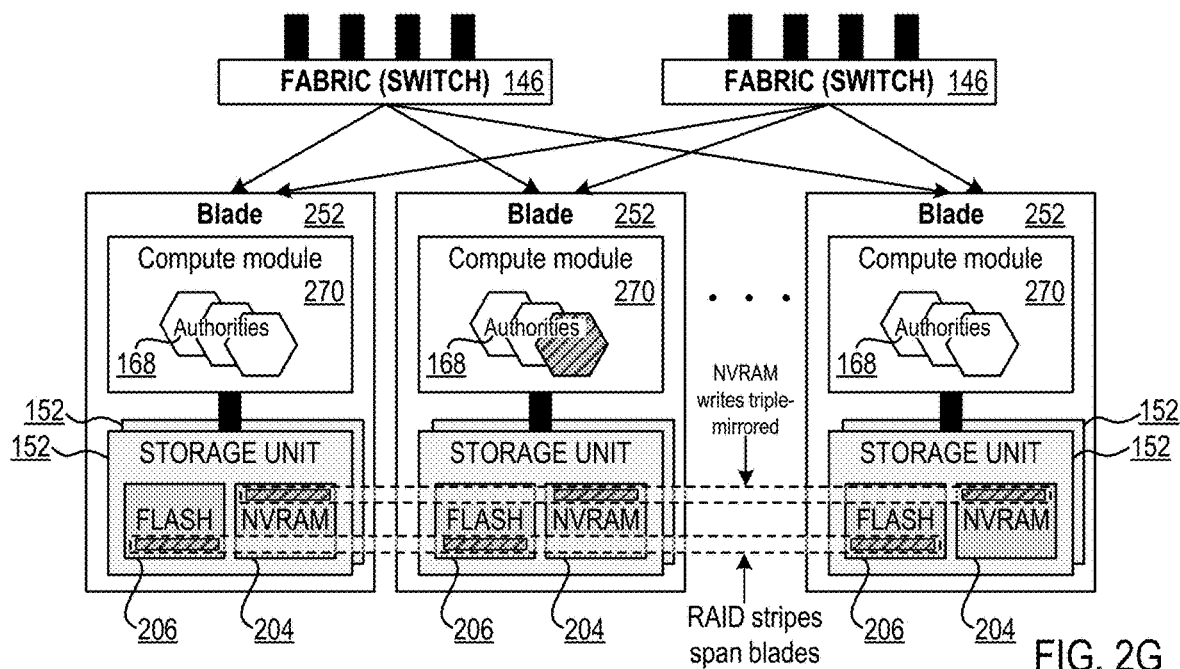
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
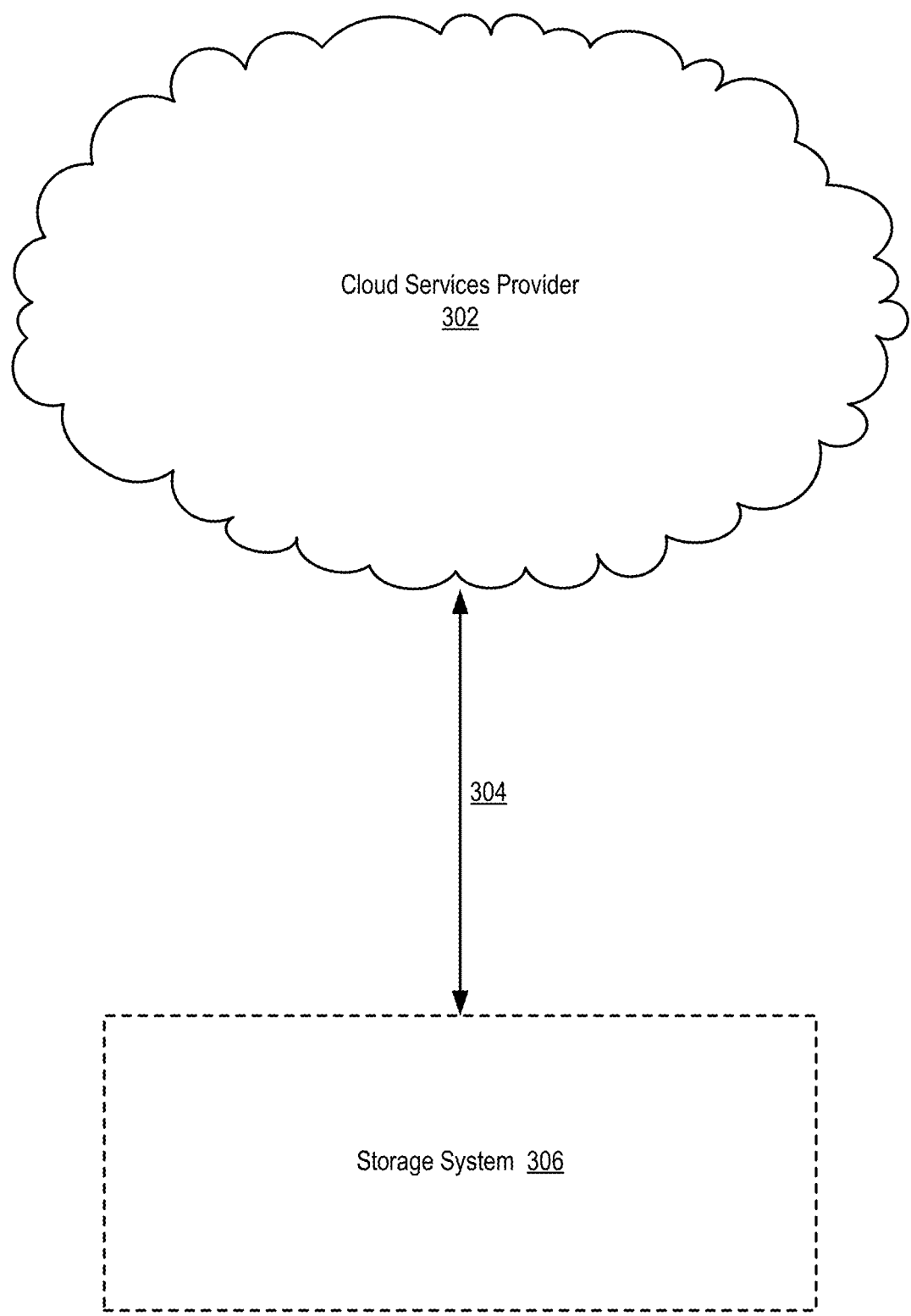
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
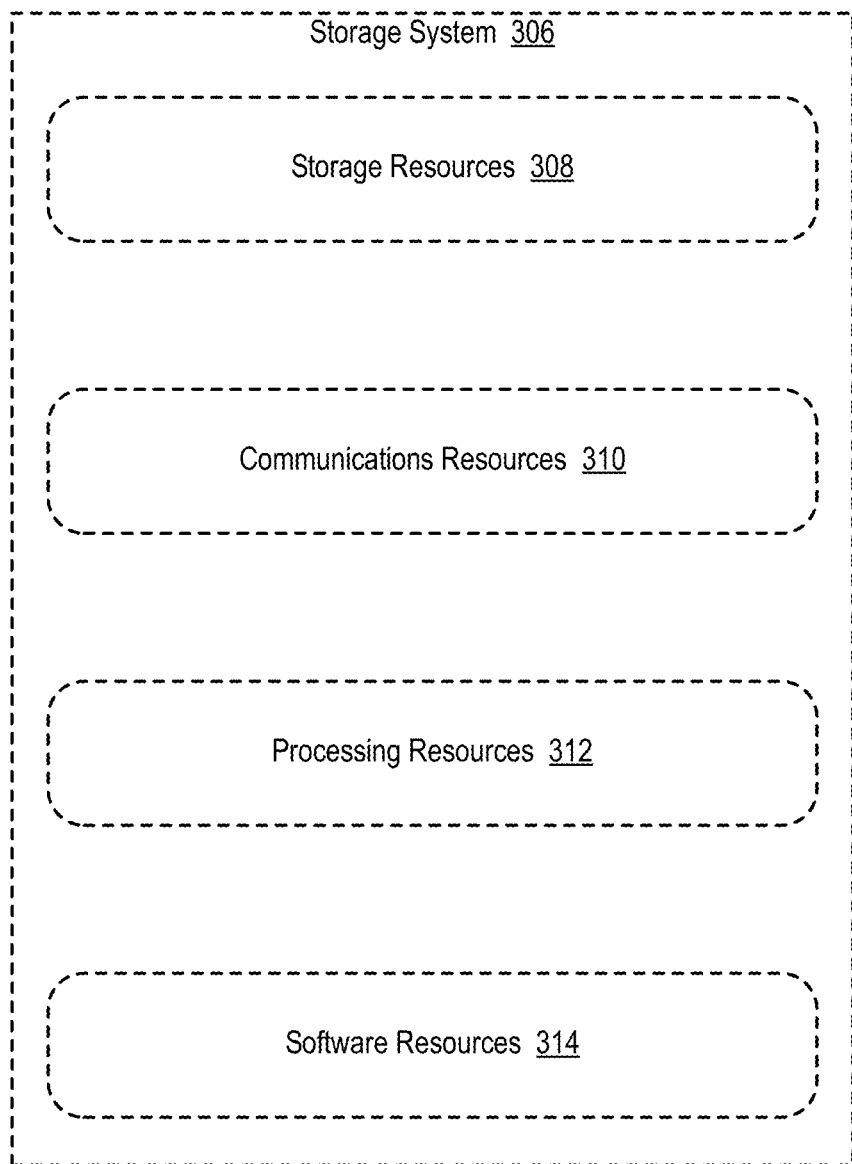
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint nonvolatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach, or in other ways.

Readers will appreciate that the storage system 306 depicted in FIG. 3B may be useful for supporting various types of software applications. For example, the storage system 306 may be useful in supporting artificial intelligence applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, and many other types of applications by providing storage resources to such applications.

For further explanation, FIG. 4A sets forth diagrams of storage integration service 404 for integrating cloud storage services in accordance with some embodiments of the present disclosure. Storage integration service 404 may implement data storage features described above with reference to FIGS. 1A-1D, FIGS. 2A-2G, and FIG. 3 as storage integration service 404 may include some or all of the components described above—in addition to integrating and augmenting cloud storage services from multiple cloud storage services. For example, using service interface 404, a client device may access or initiate any of the data storage operations described above with regard to FIGS. 1A-1D and FIGS. 2A-2G, where those data storage operations are implemented by storage integration service 404, one or more cloud storage services being integrated, or a combination of storage integration service 404 and the one or more cloud storage services being integrated.

Storage integration service 404 may provide a single, consistent user experience via a user interface for managing data storage across multiple cloud storage services—where storage integration service 404 may seamlessly, or in some cases invisibly, integrate features or services provided by the multiple cloud storage services. However, beyond seamless, or invisible, integration of cloud storage services, storage integration service 404 may also provide data storage management features that are not available through cloud storage services being integrated, and storage integration service 404 may also augment functionality, replace functionality, or introduce functionality that is not present within, one or more of the cloud storage services by modifying or transforming data prior to storing data, or subsequent to accessing stored data. In some cases, all added layered data services provided by storage integration service 404 make it simple and easy to access storage services for all major public cloud providers and on premises (on prem) commodity cloud environments in a simple, easy and consistent way. Once the code has been written for any of them (e.g. Azure™, Google™ Amazon™, OCP open source environments http://www.opencompute.org/), it will run on and optimize all. Storage integration service 404 may also provide metering of capacity used by underlying cloud provider versus capacity provisioned, types of capacity (SSD, Disk, Object, storage class memory, etc.), IOPS, bandwidth, percentage of reads, percentage of writes, average block size and more. Storage integration service 404 may show live, up to date pricing comparisons with workload modeling on competing services including available and compatible on-premises solutions. In short, storage integration service 404 may work to effectively pool cloud resources together more efficiently to optimize user experience and economics while increasing asset utilization and performance by using the fewest underlying chargeable services from a given cloud provider to enable more desirable application and business outcomes.

With regard to providing data storage management features, and in the case where the cloud storage services may be visible to the user and a data storage management interface is provided by storage integration service 404, storage integration service 404 may provide data storage management options that are not provided by the cloud storage services being integrated. For example, storage integration service 404 may provide data storage management operations including one or more of: de-provisioning, automatically or manually, data storage; cloning; migration; snapshotting; data reduction; provisioning, pooling, automatically or manually, adding and aggregating additional data storage volumes, blocks, data objects that may be of various sizes of data; thin-provisioning; requesting data storage metrics; requesting and calculating dynamic and future recommendations for data storage management operations for superior utilization of both space and performance; specifying levels of service or quality of service (QoS); specifying performance requirements; specifying types or quantities of data storage; requesting guidance for provisioning data storage; among other data management features. Further, a user may manage all stored data using the data storage management interface, and data storage management operations, provided by storage integration service 404 without being aware of how to perform a given data storage management operation unique to or different to the underlying cloud storage service, and without being aware of any access protocols or application programming interface calls or parameters for individual cloud storage services. In other words, for any given data storage management operation, a user may indicate data management operations to a data storage management interface provided by storage integration service 404, and storage integration service 404 may determine a set of corresponding instructions and/or operations to be issued to the underlying integrated cloud storage services. This may be considered an "intent based deployment" where services are described in a universal manger and executed in each cloud environment. to match the storage management operation/intent provided by the user to the storage integration service 404 data storage management interface.

With regard to augmenting functionality of the cloud storage services, storage integration service 404 may provide functionality applied to data stored on or retrieved from multiple cloud storage services, where the functionality provided by storage integration service 404 may include functions that are not provided by the multiple cloud storage services themselves, or replace functions provided by the cloud storage services with more efficient or effective functions. For example, the functionality provided by storage integration service 404 may modify or apply computational functions—responsive to user requests or automatically without user awareness—including one or more of: data deduplication, data reduction, data compression, encryption, data validation, data consistency models, or snapshotting. The functionality provided by storage integration service 404 may further include one or more of: metering data storage use, metering I/O operations, metering data storage device performance, metering cloud storage service performance, metering cloud storage service costs, data migration, among other functions. An advantage of the functionality provided by storage integration service 404 is that because storage integration service 404 provides an API, once a user has built their solution to use the API, the underlying cloud storage service may easily be swapped out for another without a user needing to modify any code. This helps prevent the user from being more locked in to any given cloud storage service proprietary interfaces and functionality limitations. In other words, storage integration service 404 removes current barriers, or at least reduces resource costs and helps facilitate simply and easily moving between different cloud storage services while maintaining the same functionality and no requiring an app re-write. In this way, a user may "lift and shift" between cloud storage services with fewer current complex entanglements and lower outbound price per GB costs due to optimizations like data reduction, fewer storage elements and space optimization technologies provided by 404. Further enabling the mobility of data provided by storage integration service 404 is that storage integration service 404 may provide a storage service marketplace where a user may be presented with information on migration costs, costs associated with storing migrated data on another storage service, including transaction costs, and where all of this storage service marketplace information allows a user to easily change storage services. This data mobility provides a user with non-biased information, and with the ability to avoid being locked down due to difficulty in migrating data, where a user-given metrics and an objective indication of other options—may escape a cloud storage service that has less well fitting services including: low reliability, low storage availability, no non-biased predictive visibility into storage space or performance, lack of pre-pay options, competitive economics, slow snapshots, slow restores, lack of fast cloning, lack of ability to easily and non disruptively replicate between (1) on-premise storage to cloud storage, (2) cloud storage provider A to cloud storage provider B or (3) lack of other data required management options.

Storage integration service 404 may include a module such as service interface 406 to provide a user interface to different client devices such as client devices 450A-450M to receive data storage operations or data management operations, and to provide updates or status information. Storage integration service 404 may be implemented within cloud services provider 402, as depicted in FIG. 4A, or across multiple data centers (not depicted), or more generally within any cloud service provider. In some examples, storage integration service 404 may be implemented within a remotely accessible data center that is accessible to client devices over a network, in other implementations, storage integration service 404 may be implemented within a local computing environment that includes client devices sharing a local area network, wide area network, or some other type of shared network. As a representative, but not exhaustive, list, some cloud storage services integrated by, or augmented by, storage integration service 404 may include one or more services, including block storage services, from providers including, but not limited to, one or more of: Google™, Microsoft™, Amazon™, or Pure Storage™, on-premises solutions, among others.

In this way, storage integration service 404 may allow a user of storage services to utilize at least some features of the underlying, multiple cloud storage services more efficiently or economically than if a user provisioned data storage across the multiple cloud storage services directly. For example, storage integration service 404 may—through the application of one or more data transformations, prior to or subsequent to, data being stored within one or more cloud storage services, such as data deduplication, data compression, among other data transformations—present a user with a greater effective, or usable, storage capacity than a provisioned quantity of physical storage capacity of a cloud storage service in contrast to the user directly accessing the same, provisioned quantity of physical storage capacity from a cloud storage service.

Storage integration service 404 may also provide a user experience, via a clearly defined user interface, that is more intuitive and easy to operate, thereby making management of stored data more efficient and user friendly. Further, service interface 406 may include multiple access points available simultaneously to multiple clients, such as client devices 450A-450M, one or more applications 453, or one or more virtual instances or virtual machines 454, where each client may access a provided user interface and an accompanying set of programmable APIs. In this example, storage integration service 404 may be available to client devices 450A-450M over network 452, which may be any type of computer network, such as a local area network or such as the Internet.

Storage integration service 404 may also provide, as discussed above, data management options for managing stored data that may not be provided by cloud storage services storing the data. For example, a given cloud storage service may provide block-based storage, where the cloud storage service may provision storage capacity in quantities measured in terms of blocks or some other fixed size quantity, and where a cost for the provisioned storage capacity is dependent on a number of blocks provisioned and not an amount of data stored within the provisioned blocks. In such an example, storage integration service 404 may provide a data storage management operation for provisioning data storage in quantities that are smaller than an entire block of storage. In other words, storage integration service 404 may provide thin-provisioning where a cloud storage service does not, but where the cloud storage service provides the physical data storage.

As one example, a user may access a user interface via service interface 404 and the user may choose to provision 10 TB of data storage, where storage integration service 404 may provide 10 TB of available data storage to be used based on a smaller quantity of physical data provisioned from cloud storage services. In this example, the user may initially upload 1 TB of data. In this example, storage integration service 404 may receive the instructions to provision data and receive the 1 TB of data over network 452. Given the 1 TB of uploaded data, storage integration service 404 may apply one or more data transformations implemented by one or more of functional modules 412A-412N to generate transformed data, where these data transformations may or may not have been specified by the user. In this example, storage integration service 404 applies functional module 412A, which implements a data compression technique, to generate transformed data, where the transformed data may be smaller in size than the original 1 TB of uploaded data. Other functional modules may implement data transformation techniques, and in some cases, storage integration service 404 may apply multiple functional modules from among functional modules 412A-412N. In some cases, one or more applied data transformation may result in no change to the original data, for example, where original data may not be compressible, however, thin provisioning for better asset utilization may still be applicable.

In this example, given the transformed data, storage integration service 404 may provision data storage for storing one or more portions of the transformed data from cloud storage service 422.

Further in this example, storage integration service 404 may calculate, based on results from applications of one or more of the functional modules, that for each 1 TB of data uploaded by a user, 500 MB of physical storage space is sufficient to store the transformed 1 TB of data. In other words, application of the one or more functional modules results in a storage size reduction of 50%. Consequently, given that a user has requested 10 TB to be provisioned, storage integration service 404 may satisfy the request to provision 10 TB by provisioning 5 TB. However, because the user expects 10 TB of data storage, storage integration service 404 may implement address translation to translate from a 10 TB address space into a 5 TB address space. Storage integration service 404 may further, for each 10 operation for storing or writing data, generate metadata to identify one or more locations across one or more cloud storage services in the event that the payload, or write data, is divided and distributed across the one or more cloud storage services. In other words, the physical space requirements for each unit of data—after being transformed—are smaller than the initial size of the unit of data. In this example, storage integration service 404 may provide an address space that corresponds to twice the size of the provisioned physical storage space. In short, storage integration service 404 may provide an address space that is larger than an address space corresponding to the provisioned physical storage size by providing a virtual or logical address space that is larger than the physical address space of the provisioned storage capacity, where storage integration service 404 may further maintain a mapping, or translation table, that maps virtual or logical addresses that are visible to a user, to physical addresses that are correspond to physical storage on one or more physical storage devices among one or more cloud storage services. Generally, providing a user with greater usable storage than provisioned physical storage across multiple cloud storage services may be carried out by storage integration service 404 providing a virtual or logical address space in dependence upon storage size of provisioned physical capacity and in dependence upon expected, or estimated, data reduction sizes—where the expected, or estimated, data reduction sizes may be dependent upon one or more applications of one or more functional modules 412A-412N within functional layer 412. Similarly, in other examples, storage integration service 404 may—for a given quantity of provisioned physical data storage—provide different virtual, or logical, address spaces to multiple users.

Storage integration service 404 may also provide other data management options that are either not available with one or more cloud storage services or that are available through a different management interface. For example, a cloud storage service may provide for management of data using an interface that requires, for a given data storage operation, more parameters to be defined by a user than an interface provided by service integration service 404. In some cases, service integration service 404 may provide a user with options for specifying or provisioning quantities or types of storage in a manner that is different, more efficient, or more streamlined than a cloud storage service being integrated. For example, in determining how much storage capacity to provision, service interface 406 may present a user with options for describing use cases, or using abstract, non-technical business level Service Level Agreement (SLA) terminology, where service interface 406 may interpret the use case/intent based information, or the non-technical terminology and infer, or determine, one or more technical parameters for specifying data storage types, capacity, or both. In some cases, the options for describing intent based definitions for what a user is attempting to specify may be provided using abstract, non-technical terminology that is not provided for by cloud storage service being integrated. For example, a user may specify storage requirements by requesting storage space for "storing customer records for a small grocery store," and storage integration service 404 may determine one or more technical parameters in response to parsing and determining corresponding technical parameters sufficient to satisfy the client request, such as "I want the performance to be as fast as possible," a quantity of storage, a minimum or maximum number of I/O operations, uptime, or other technical parameters. In other examples, storage integration service 404 may aggregate, simplify, or provide an analysis of data storage metrics from the cloud storage services being integrated, where storage integration service 404 may then provide, for example via a management console, the analysis of data storage metrics.

To carry out interacting with and managing other cloud storage services, storage integration service 404 may include an integration module, such as integration module 410, that includes functional layer 412 for determining and applying data transformations and translation layer 414, or substrate, for translating between communication protocols, translating between data storage operations or techniques, or both. To carry out generating recommendations for data storage management options, storage integration service 404 may include an analysis engine 408 for analyzing one or more data storage metrics, including trending information, and determining one or more ongoing recommendations for the user. For example, a user may request one or more options for optimizing current data storage, and in response, analysis engine 408 may request, or access previously tracked and stored, data storage metrics or performance metrics, from the cloud storage services being integrated, and then use these metrics to determine, and provide to the user, one or more data storage operations that would improve one or more of the measured metrics.

In this way, data provisioned to a user may appear to be provided by a single storage service provider, storage integration service 404—where the single, or multiple, cloud storage services being integrated may be invisible to the user, or where the user may use a single set of data storage management operations provided by storage integration service 404 instead of data storage management operations provided by the cloud storage services being integrated. Such a system configuration for storage integration service 404 allows ease of use for a user, with greater functionality for provisioned data storage managed by storage integration service 404 and provided to the user in comparison to independent, direct management of provisioned data using one or more cloud storage services. In short, storage integration service 404 may provide a user with useful data with regard to actual costs of underlying cloud storage services, where the user may then make informed comparisons between different cloud storage services offerings without needing to interpret different dimensions by which the underlying cloud storage services may provision data. It will also show how much customer is saving monetarily versus simply using native storage services from provider by calculating how much more capacity and performance would be required if data services plane were not leveraged all optimized data services including but not limited to thin, data reduction, clones, aggregation and pooling etc.

Figure 4B:
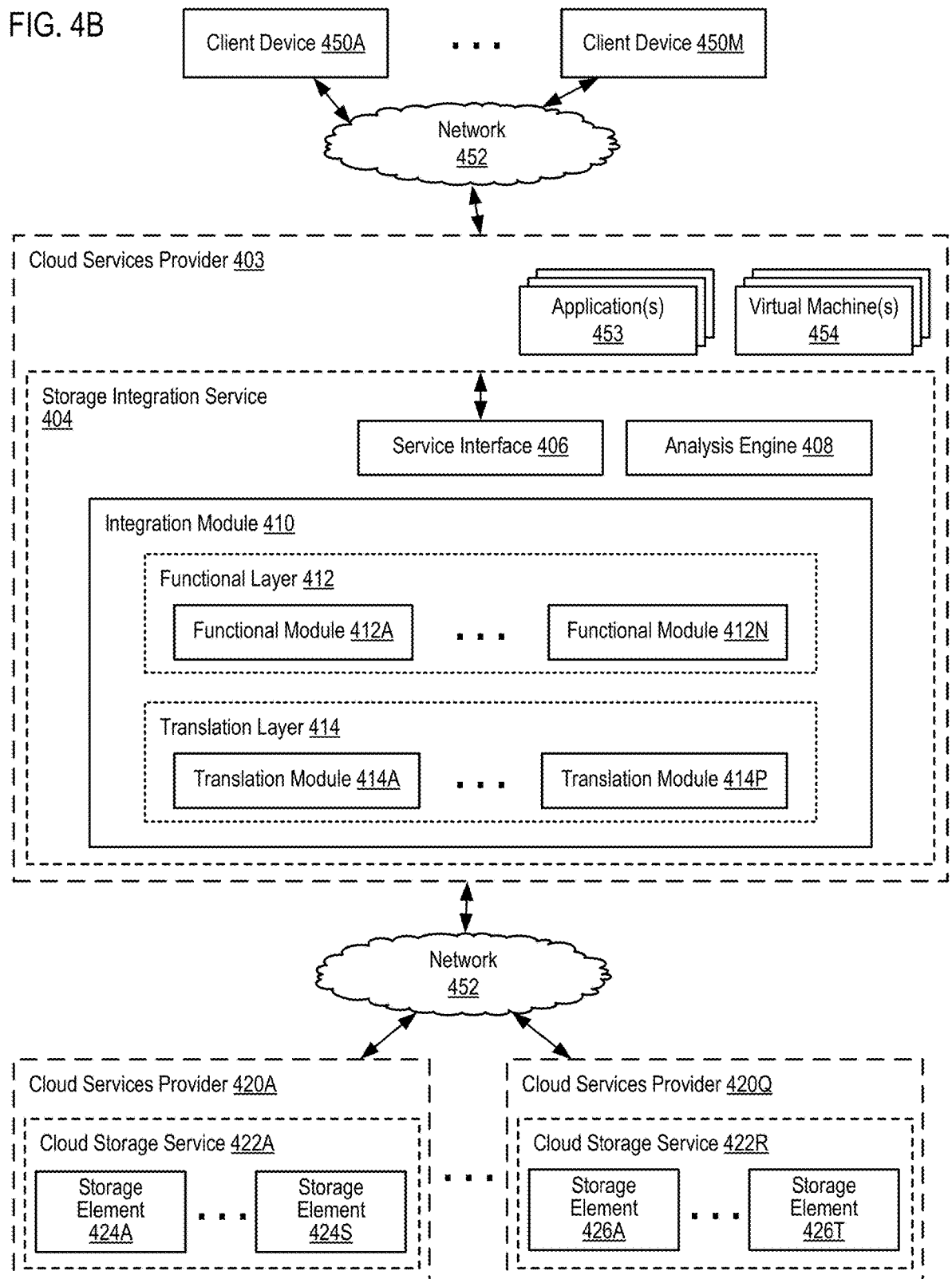
FIG. 4B sets forth a diagram of a storage integration service in accordance with some embodiments of the present disclosure.

For further explanation, FIG. 4B sets forth diagrams of storage integration service 404 for integrating cloud storage services in accordance with some embodiments of the present disclosure. Storage integration service 404 may implement data storage features described above with reference to FIGS. 1A-1D, FIGS. 2A-2G, and FIG. 3 as storage integration service 404 may include some or all of the components described above—in addition to integrating and augmenting cloud storage services from multiple cloud storage services.

As depicted in FIG. 4B, storage integration service 404 may be implemented within one cloud services provider, in this example cloud services provider 403, and communicate with multiple cloud storage services implemented by other cloud services providers, in this example, cloud services providers 420A-420Q. Compared to an implementation of storage integration service 404 within the same cloud services provider as an underlying cloud storage service as depicted in FIG. 4A, this implementation of storage integration service 404 may incur network and other latencies based on proximity and connectivity established. However, having multiple underlying cloud storage services may provide other, counterbalancing benefits. For example, in provisioning data storage, storage integration service 404 may determine, based on selection criteria, one or more of cloud storage services 422A-422R from which to provision data storage for storing one or more portions of the transformed data, where cloud storage services 422A-422R may be implemented across one or more of cloud services providers 420A-420Q, and where cloud storage services 422A-422R may respectively manage one or more storage elements, such as storage elements 424A-424S and 426A-426T.

In this example, the selection criteria may be based on one or more of: cost of storage, reliability, responsiveness, load capabilities, service level agreements, or ratings information, such as social media ratings. Further, an initial, or day 0, implementation of the selection criteria may also be determined based on one or more storage parameters provided by the user via the service interface 406 user interface, such as an indication of using a specific type of storage device, a live SaaS catalog of cloud storage provider cost models, workload modeling, a specific type of storage configuration, a specific cloud storage service, a specific level or type of authentication or security, or some combination of these or other factors. Given that workloads and datasets may change over time, an initial, or day 0 implementation of selection criteria may correspondingly and dynamically change over time—where selection criteria may be updated or modified in response to a user accepting storage solution recommendations or policies generated by storage integration service 404 or by intent based SLAs designated by end user. For example, storage integration service 404 may continuously monitor and contrast cost and performance options for multiple different cloud storage services, and periodically or aperiodically provide a user with a data storage marketplace analysis. These ongoing recommendations may provide a user data mobility based on cost of move, ongoing costs one relocated, regional optimizations, marketplace changes, or changing requirements after initial deployment over spans of months or years. Storage integration service 404 may generate recommendations based on cost information from multiple other cloud storage services, where storage integration service 404 may periodically provide a user with information indicating savings as compared to other cloud storage services. In other cases, the selection criteria may be derived, as discussed above, from one or more storage parameters or intent provided by the user, or based on a combination of derived storage parameters and provided storage parameters. Further in this example, given the transformed data, storage integration service 404 may use, for each selected cloud storage service selected based on the selection criteria, a corresponding translation module from among translation modules 414A-414P, where a given translation module may enable service integration service 404 to interface with, communicate with, or manage a corresponding cloud storage service. In this example, if the transformed data were determined to be stored among both cloud storage service 422A and cloud storage service 422R, then storage integration service may select a translation module corresponding to cloud storage service 422A for communicating with cloud storage service 422A and for performing any given data storage operation, and storage integration service may select a translation module corresponding to cloud storage service 422R for communication with cloud storage service 422R and for performing any given data storage operation. In some cases, a single translation module from among translation modules 414A-414P may be used for communicating with more than a single cloud storage service.

Figure 4C:
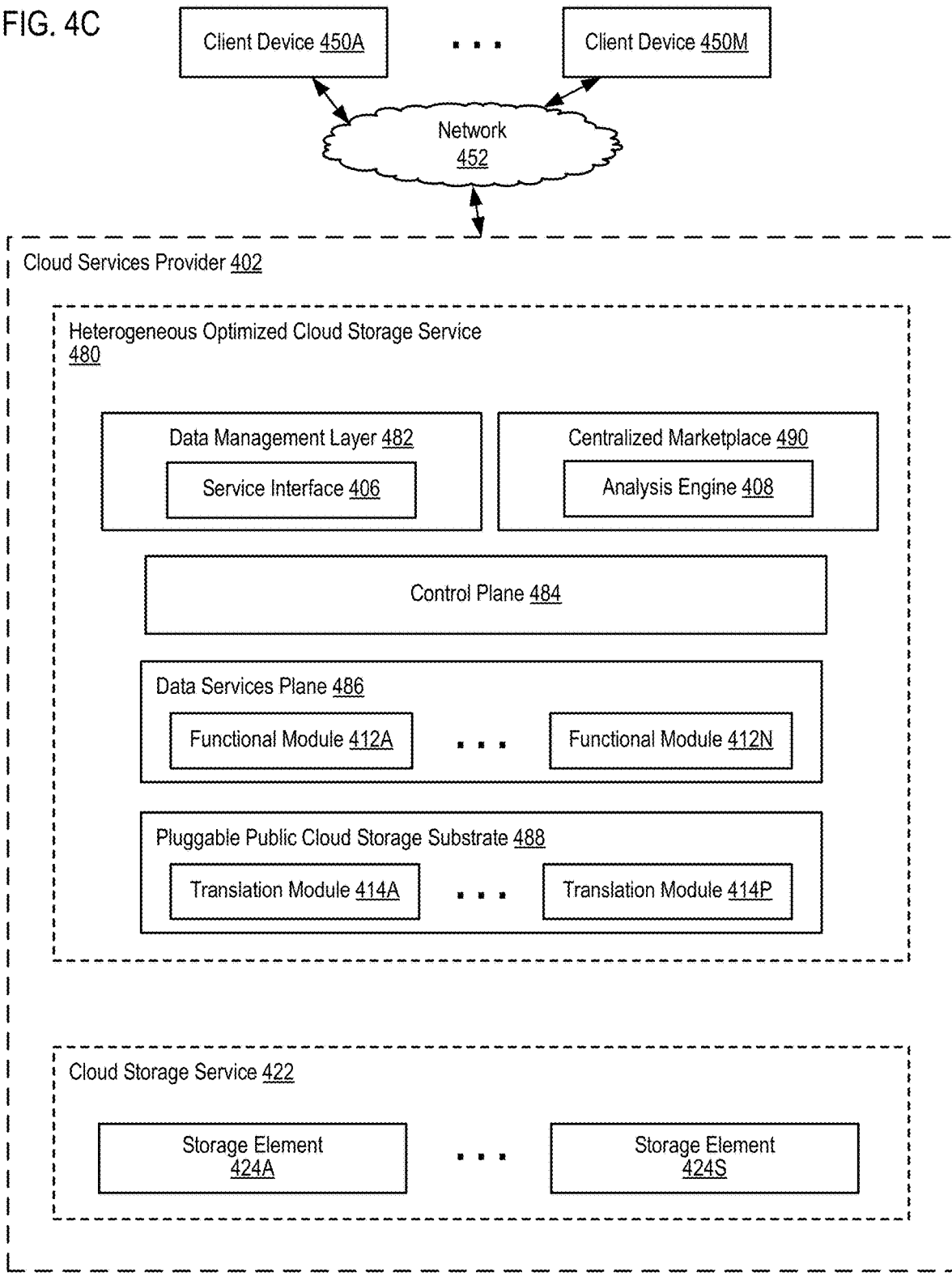
FIG. 4C sets forth a diagram of a heterogenous optimized cloud storage service in accordance with some embodiments of the present disclosure.

For further explanation, FIG. 4C sets forth diagrams of heterogeneous optimized cloud storage service 480 for optimizing and integrating cloud storage services in accordance with embodiments of the present disclosure. Heterogeneous optimized cloud storage service 480 may implement data storage features described above with reference to FIGS. 1A-1D, FIGS. 2A-2G, and the storage integration service 404 described in FIGS. 3A and 3B, as heterogeneous optimized cloud storage service 480 may include some or all of the components described above—in addition to integrating and augmenting cloud storage services from multiple cloud storage services.

While heterogeneous optimized cloud storage service 480 may implement all of the functionality described with reference to storage integration service 404, heterogeneous optimized cloud storage service 480 depicts an implementation with a different organization of layers for clarifying different service features.

Heterogeneous optimized cloud storage service 480 includes a data management layer 482, a control plane 484, a data services plane 486, a pluggable public cloud storage substrate 488, and a centralized marketplace 490.

Data management layer 482 may implement one or more of: an API, a REST API, Powershell, Python, CLI, a web user interface, a mobile app user interface, or more generally, a software interface usable to manage, monitor, or report on any managed, optimized cloud storage.

Control plane 484 may handle user based commands and may manage data services plane 486 with commands from data management layer 482. Further, control plane 484 may handle security integration to ensure that a given user has appropriate rights to execute a requested function. In some cases, security functionality may include implementations of security systems such as LDAP, but generally may comply with common authentication and authorization requirements standards.

Data services plane 486 may implement functionality to perform each of the data storage features described with reference to storage integration service 404. Data services plane 484 may execute on one or more servers to balance loads from multiple different hosts or client devices, which may provide high availability and resiliency to allow operation and maintain service in case of hardware or software faults. Data services plane 486 may create or manage storage elements such as LUNs, file systems, or data objects—where in some cases, each of these functions may be driven from data management layer 482 or from a central console for a fleet of storage systems. Data services plane 486 may implement one or more hardware or software modules to provide the data storage features described with reference to storage integration service 404.

Pluggable public cloud storage substrate 488 may communicate with one or more storage elements or with one or more cloud storage services. Further, pluggable public cloud storage substrate 488 may implement adapters for each supported cloud storage service, in addition to on prem providers. Pluggable public cloud storage substrate 488 may interface and communicate with supported cloud storage services via APIs for each supported cloud storage service— where these communication calls may serve to enable the data storage functionality described above with reference to data services plane 486.

Centralized marketplace 490 may received, log, and manage telemetry information from one or more instances of cloud storage services, where analysis and metering information may be generated and provided to a user. Centralized marketplace 490 may maintain an up-to-date catalog of comparative pricing information for the managed data on the cloud storage services. Centralized marketplace 490 may also provide TCO and savings data in terms of how much a customer is saving based on the functionality provided by heterogeneous optimized cloud storage service 480. Centralized marketplace 490 may also provide a marketplace with data storage offerings with custom modeled workload comparisons based on price or proximity based on the telemetry data. In some cases, data may be provided to multiple other layers, including data management layer 482 or data services plane 486.

Figure 5:
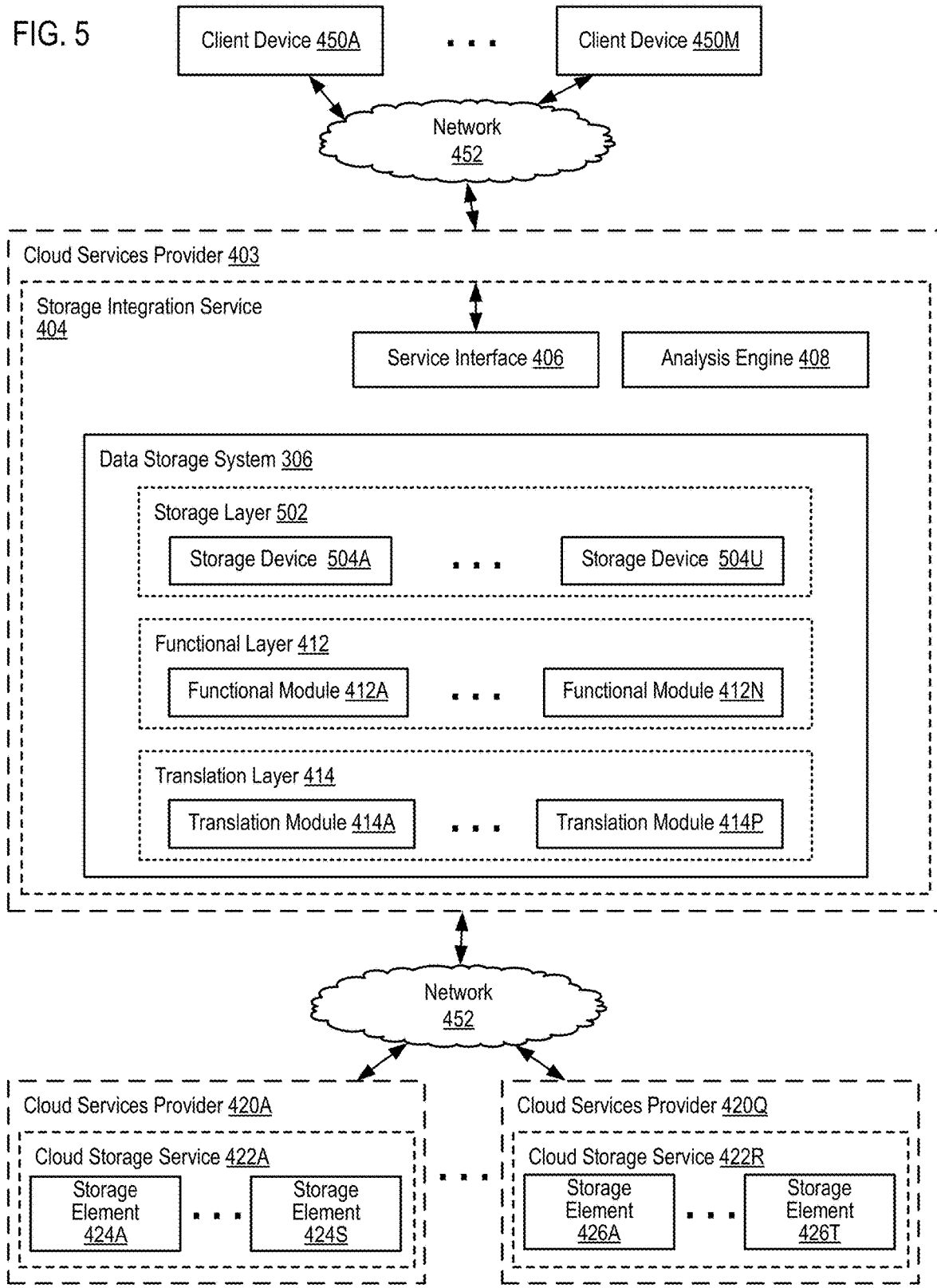
FIG. 5 sets forth a diagram of a storage integration service in accordance with some embodiments of the present disclosure.

For further explanation, FIG. 5 sets forth diagrams of storage integration service 404 for integrating cloud storage services in accordance with some embodiments of the present disclosure. Storage integration service 404 may implement data storage features described above with reference to FIGS. 1A-1D, FIGS. 2A-2G, and FIG. 3 as storage integration service 404 may include some or all of the components described above—in addition to integrating and augmenting cloud storage services from multiple cloud storage services. For example, using service interface 404, a client device may access or initiate any of the data storage operations described above with regard to FIGS. 1A-1D and FIGS. 2A-2G, where those data storage operations are implemented by storage integration service 404, one or more cloud storage services being integrated, or a combination of storage integration service 404 and the one or more cloud storage services being integrated.

In contrast to the example storage integration service describe with reference to FIGS. 4A and 4B, storage integration service 404 in FIG. 5 includes a storage layer 502, where storage layer 502 may include one or more storage devices 504A-504U. Storage integration service 404 depicted in FIG. 5 may provide all the feature and functionality described above with storage integration service 404 in FIGS. 4A and 4B. For example, a storage operating system implemented by data storage system 306 may include implementations of functional modules 412A-412N of functional layer 412, and may include implementations of translation modules 414A-414P of translation layer 414. However, storage integration service 404 in FIG. 5 may provision physical data storage from among storage devices 504A-504U in addition to, or instead of, provisioning physical data storage from one or more of cloud storage services 422A-422R. In this way, storage integration service 404 in FIG. 5 may provide a faster tier of data storage that may have higher performance characteristics than data storage provided by cloud storage services 422A-422R. In some examples, storage integration service 404 may be on a local network and cloud storage services are accessed remotely.

Storage integration service 404 may integrate local storage provided by storage layer 502 with data storage provided by one or more cloud storage services. For example, storage integration service 404 may provision a particular quantity of data storage to a user, and portions of the provisioned data storage may be stored within any combination of local storage devices 504A-504U of storage layer 502 and storage devices among one or more of cloud storage service 422A-422R. In this, while stored data may be segmented across multiple physical storage devices among local storage and remote cloud storage services, a user is presented with a single, consistent logical volume or volumes of data storage. For example, in the case that data storage system 306 implements a RAID architecture, segments of a given stripe of data to be stored may be stored across multiple different storage solutions, including local storage layer 502 and cloud storage services 422A-422R.

Figure 6:
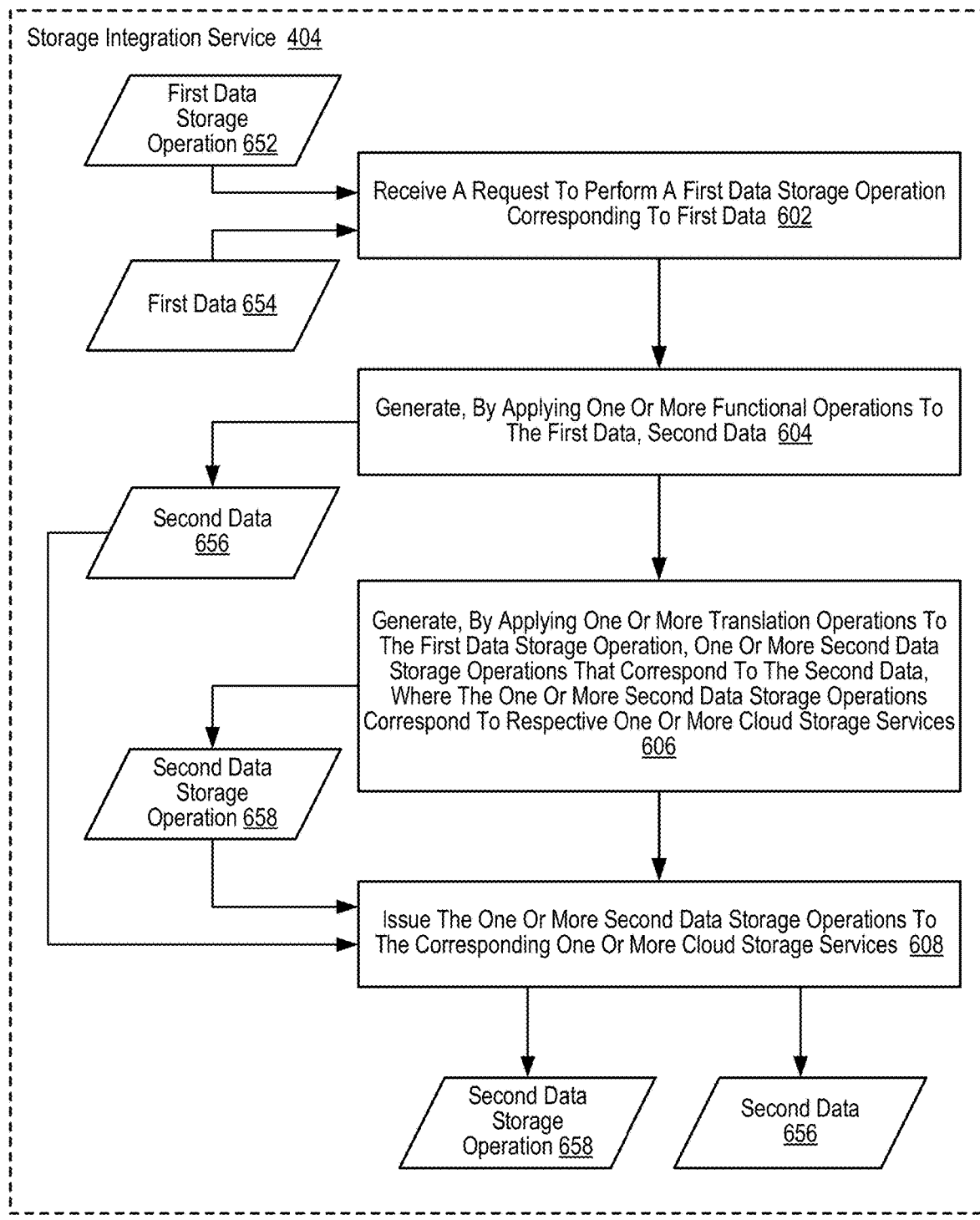
FIG. 6 sets forth a flow chart illustrating an example method of integrating cloud storage services according to some embodiments of the present disclosure.

For further explanation, FIG. 6 sets forth a flow chart illustrating an example method of integration storage services in a storage integration service 404 according to some embodiments of the present disclosure. Although depicted in less detail, the storage integration service 404 may implement data storage features described above with reference to FIGS. 1A-1D, FIGS. 2A-2G, and FIG. 3 as storage integration service 404 may include some or all of the components described above—in addition to integrating and augmenting cloud storage services from multiple cloud storage services. For example, using service interface 404, a client device may access or initiate any of the data storage operations described above with regard to FIGS. 1A-1D and FIGS. 2A-2G, where those data storage operations are implemented by storage integration service 404, one or more cloud storage services being integrated, or a combination of storage integration service 404 and the one or more cloud storage services being integrated. Further, the storage integration service depicted in FIG. 6 may include the same, fewer, or additional components as the storage systems described above.

The example method depicted in FIG. 6 includes receiving (602) a request to perform a first data storage operation 652 corresponding to first data 654. Receiving (602) the request to perform the first data storage operation 652 corresponding to first data 654 may be carried out by storage integration service 404 receiving a message at one of one or more access points implemented by service interface 406, depicted in FIG. 5, from a client device 450, where the message is transmitted across network 452. An access point may provide a communication interface for a content browser on a client device, a mobile application ('app'), or some other electronic device. For example, storage integration service 404 may provide, via service interface 404, a user interface depicting a layout including one or more of: menu options, selection boxes, wizards, a chatbot option, or a command line interface. In this example, a given user interface selection or selections may correspond to or be translated into a data storage operation or a data storage management command, such as a request to perform the first data storage operation 652 corresponding to first data 654. While this example provides a user interface to remote client devices, in other examples, storage integration service 404 may be implemented within a local computer system, where service interface 406 provides a user interface to a local client device within the local computer system, where the user interface provides similar functionality as described above with reference to remote client devices accessing the user interface through an access point provided by service interface 406.

The example method depicted in FIG. 6 also includes generating (604), by applying one or more functional operations to the first data 654, second data 656. As described above with reference to FIGS. 5 and 6, generating (604) the second data 656 by applying the one or more functional operations to the first data 654 may be carried out by storage integration service 404 determining one or more functional operations to perform or apply to the first data 654. For example, determining the one or more functional operations may be carried out by selecting one or more default functional operations that are applied to all stored data, such as one or more of data compression, data deduplication, a null operation that produces an output equal to an input, among others discussed above with regard to FIGS. 4 and 5. The default functional operations may be specified by storage integration service 404 or specified by a system administrator. Further, determining the one or more functional operations may be carried out by analyzing one or more inputs provided via the service interface 604 indicating one or more functional operations, such as encryption, data validation, among others. In this example, given the application of the determined one or more functional operations, the corresponding output is second data 656. However, in other examples, generating (604) the second data 654 may be an optional step, and the method proceeds from receiving (602) the request to generating (606) the one or more second data storage operations, and where the second data 656 in this example is replaced by first data 654. In other examples, a user may specify one or more functions to apply, or the user may specify and upload one or more functions to apply to data.

The example method depicted in FIG. 6 also includes generating (606), by applying one or more translation operations to the first data storage operation, one or more second data storage operations that correspond to the second data 656, where the one or more second data storage operations correspond to respective one or more cloud storage services. Step (606) may be carried out by determining which one or more cloud storage services to be used, and determining a mapping, or translation, between the first data storage operation and respective, corresponding, data storage operations on the respective one or more cloud storage services. For example, prior to receiving (602) the request to perform the first data storage operation, a user may specify the one or more cloud storage services to use, and in this case, storage integration service 404 may determine the one or more cloud storage services that are available to the user by accessing a record of the specified cloud storage services. In other examples, a user may specify a quantity of data storage to provision along with one or more data storage requirements, such as performance requirements, type of storage, reliability, security, cost, service levels, among other features—with no specification of a particular cloud storage service, and where storage integration service 404, in dependence upon the specified data storage requirements, selects one or more data storage services that meet the specified data storage requirements to be used, and to be available to the user.

Further, given the available one or more cloud storage services to be used, storage integration service 404 may then select which of the available cloud storage services to use in response to receiving the first data operation. Storage integration service 404 may select one or all of the available cloud storage services in carrying out the requested first data storage operation. For example, if the first data storage operation is a write command of a segment of data, which after step (604) may be considered second data 656, then storage integration service 404 may determine which of the available one or more cloud storage services to use for storing the second data 656. Determining which of the available one or more cloud storage services to use may be carried out by storage integration service 404 applying a selection policy that is dependent upon on a load balancing scheme that may be based on a balanced distribution of I/O operations, or by storage integration service 404 applying a selection policy. In some examples, the selection policy may be dependent upon balancing distribution of stored data among the available one or more cloud storage services, or by storage integration service 404 applying some other criteria. For example, the selection policy may specify that a lowest cost provider of cloud storage services is to be used first, or the selection policy may specify that a highest performance storage service is to be used first, or the selection policy may be based on some default criteria, or some other user specified criteria.

Continuing with this example, given the selection of the one or more cloud storage services to use, storage integration service 404 may determine how to translate the first data storage operation to give effect to, or implement, the first data storage operation among the selected one or more cloud storage services such that the result is equivalent to performance of the first data storage operation. For example, if the first data operation is a write operation, then storage integration service 404 may determine, for each of the one or more determined cloud storage services to use, a corresponding, respective write command and respective format that is appropriate for a respective cloud storage service. Further, storage integration service 404 may determine how to divide the second data 656 among the selected one or more cloud storage services, where in dependence upon how the second data 656 is divided and allocated among the selected one or more cloud storage services, the determined, respective write command appropriate for a respective cloud storage service is defined. Similarly, any given data storage operation may be analyzed to generate the one or more second data storage operations to be performed on selected one or more cloud storage services. In other words, generally, for each given cloud storage service, each data storage operation received by storage integration service 404 may be mapped to an equivalent, corresponding data storage operation on the given cloud storage service. Further, parameters for a data storage operation received from a user may be different than parameters for correspondingly mapped data storage operation on a given cloud storage service, and the mapping between data storage operations received and issued storage operations may also include mappings between parameters for a received data storage operation and parameters for issued data storage operations.

The example method depicted in FIG. 6 also includes issuing (608) the one or more second data storage operations 658 to the corresponding one or more cloud storage services selected in step (606). Issuing (608) the one or more second data storage operations 658 may be carried out by storage integration service 404 transmitting over a network, to each of the selected one or more cloud storage services, a particular second data storage operation that corresponds to a generated second data storage operation for a corresponding cloud storage service. Further, storage integration service 404 may perform any additional communications to complete or commit any transmitted data storage operation with any given cloud storage service. Storage integration service 404 may then log any result of the issued second data storage operations, provide a user with results from each individual cloud storage service, or provide the user with an aggregated message with respect to the first data storage operation instead of individual statuses of the individual cloud storage services.

Figure 7:
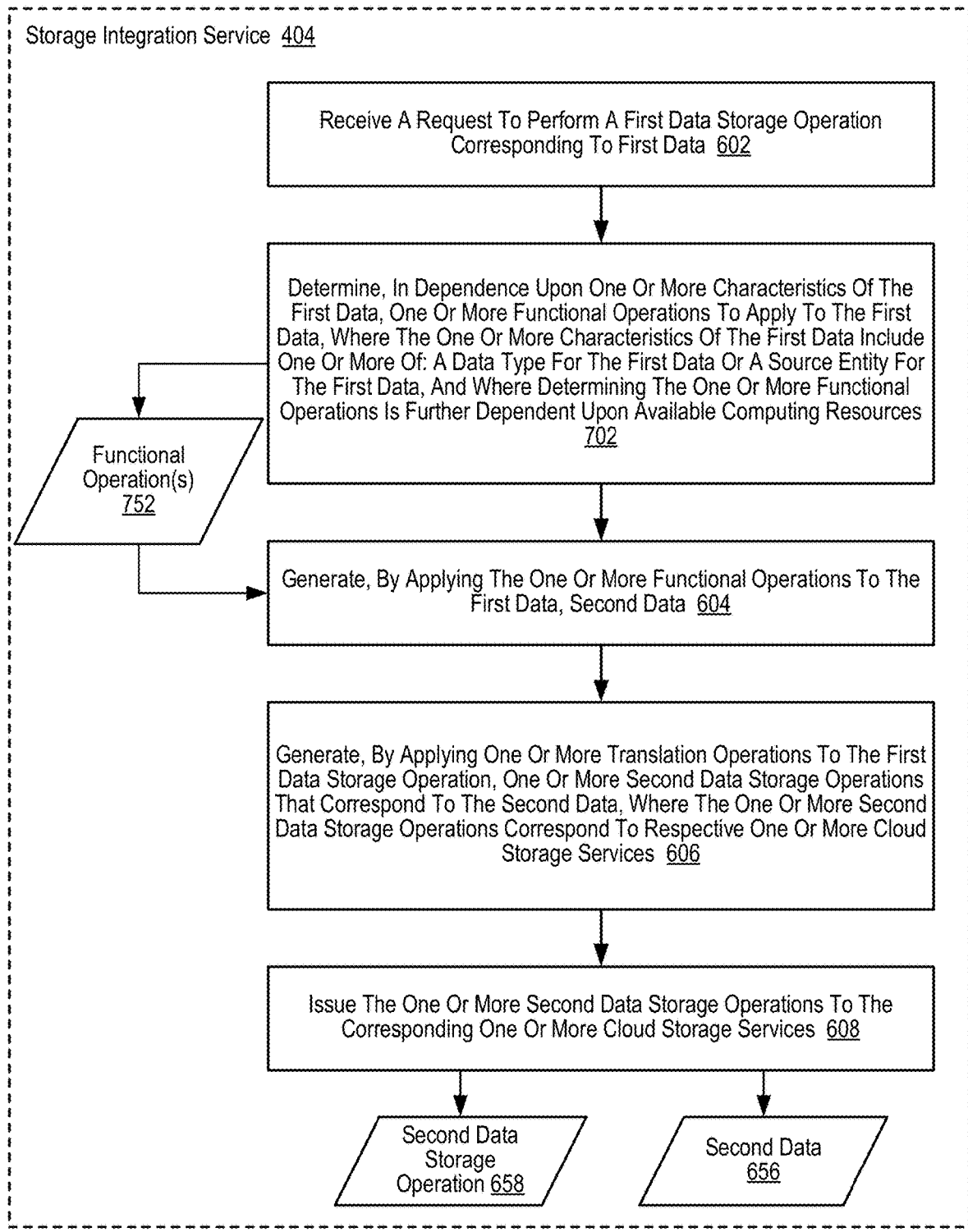
FIG. 7 sets forth a flow chart illustrating an additional example method of integrating cloud storage services according to some embodiments of the present disclosure.

For further explanation, FIG. 7 sets forth a flow chart illustrating an example method of integration storage services in a storage integration service 404 according to some embodiments of the present disclosure. The example method depicted in FIG. 7 is similar to the example method depicted in FIG. 6, as the example method depicted in FIG. 7 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 7 further includes determining (702), in dependence upon one or more characteristics of the first data, the one or more functional operations to apply to the first data, where the one or more characteristics of the first data include one or more of: a data type for the first data or a source identity for the first data, and wherein determining the one or more functional operations is further dependent upon available computing resources.

Determining (702) the one or more functional operations 752 may be carried out by storage integration service 404 identifying which functional modules from among functional modules 412A-412N are installed within storage integration service 404, and determining which functional modules among the installed functional modules are appropriate, or that may be applied to first data 654. For example, one functional module of functional modules 412 may implement a first data compression technique that achieves higher compression rates on first types of data such as different types of image formats, and another functional module of functional modules 412 may implement a second data compression technique that achieves compression rates on second types of data such as text data. In this way, in dependence upon a type of data being stored, storage integration service 404 may select one or more of functional modules 412 to apply to the first data 654. Similarly, each type of data may be mapped to one or more corresponding functional modules, and storage integration service 404 may access this mapping information in determining the appropriate functional modules to apply.

Further, in some cases, whether or not one or more of the selected functional modules are applied to the first data 654 or none of the selected functional modules are applied may be dependent upon available computer resources. For example, if a particular compression technique is resource intensive, and a measure of time estimated to complete the application of the particular compression technique with available computing resources exceeds, for example, a level of service, or a threshold limit within which I/O operations are to be performed, then storage integration service 404 may either select a different compression technique that may be less resource intensive, or storage integration service 404 may determine to apply fewer than all selected functional modules that are applicable to first data 654, or storage integration service 404 may determine not to apply any of the functional modules.

Figure 8:
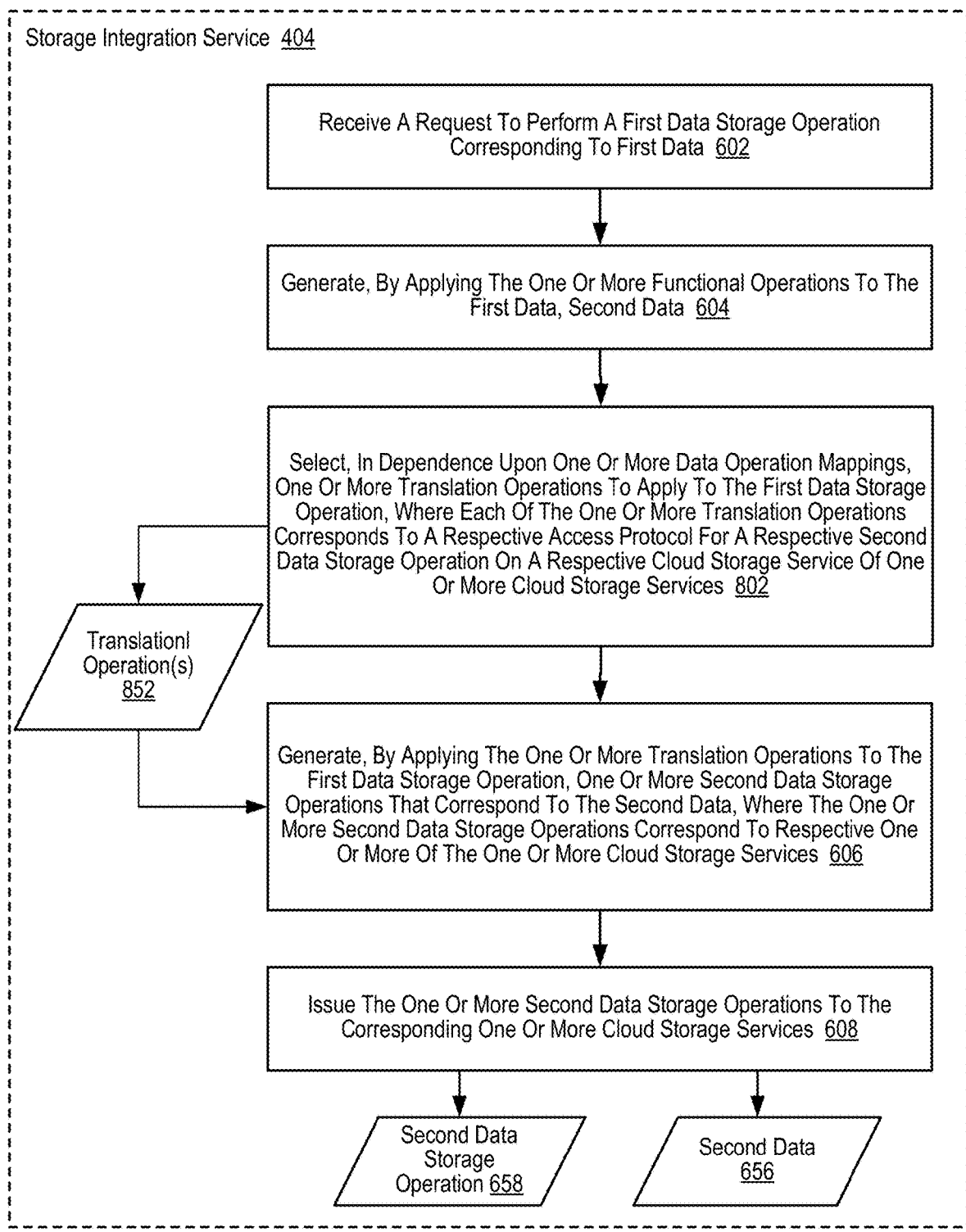
FIG. 8 sets forth a flow chart illustrating an additional example method of integrating cloud storage services according to some embodiments of the present disclosure.

For further explanation, FIG. 8 sets forth a flow chart illustrating an example method of integration storage services in a storage integration service 404 according to some embodiments of the present disclosure. The example method depicted in FIG. 8 is similar to the example method depicted in FIG. 6, as the example method depicted in FIG. 8 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 8 further includes selecting (802), in dependence upon one or more data operation mappings, one or more translation operations 852 to apply to the first data storage operation 652, where each of the one or more translation operations corresponds to a respective access protocol for a respective second data storage operation on a respective cloud storage service of the one or more cloud storage services.

Selecting (802) the one or more translation operations to apply to the first data storage operation 652 may be carried out by storage integration service 404 referencing stored mapping data that corresponds data storage operations that may be received via service interface 406 to one or more data storage operations on a given cloud storage service, such that when the one or more data storage operations are executed, they generate a result that is equivalent to executing the received data storage operation. For example, a given mapping may index a received data storage operation with stored metadata that indicates a particular cloud storage service data storage operation suitable for a particular cloud storage service, and the metadata may also indicate parameters for the particular cloud storage service data storage operation, where storage integration service 404 may translate or correspond parameters for the received data storage operation to the parameters for the particular cloud storage service data storage operation. In some cases, translating between parameters may include performing one or more calculations, or determining one or more of the parameters for the particular cloud storage service data storage operation based on the parameters for the received data storage operation. As noted above with reference to FIGS. 4A and 4B, some parameters for a received data storage operation may be inferred, and the inferred parameters may then be translated into parameters for a cloud storage service data storage operation.

In some examples, a received data storage operation of a first type of data storage operation may be translated into multiple data storage operations of different types, include a type that is different from the first type. For example, if a received data storage operation is a request to improve I/O throughput, then storage integration service 404 may translate this received request into multiple instructions that include migrating one or more sections of data from a lower performing cloud storage service into a higher performing cloud storage service and deleting the migrated data from the lower performing cloud storage service. Similarly, other received data storage operations may be provided to users at a high level of abstraction, such as a data storage request to lower storage costs, a data storage request to increase I/O performance, or some other type of request such that when the received data storage operation is translated, the resulting one or more instructions may be performing a sequence of operations across one or more cloud storage services.

Figure 9:
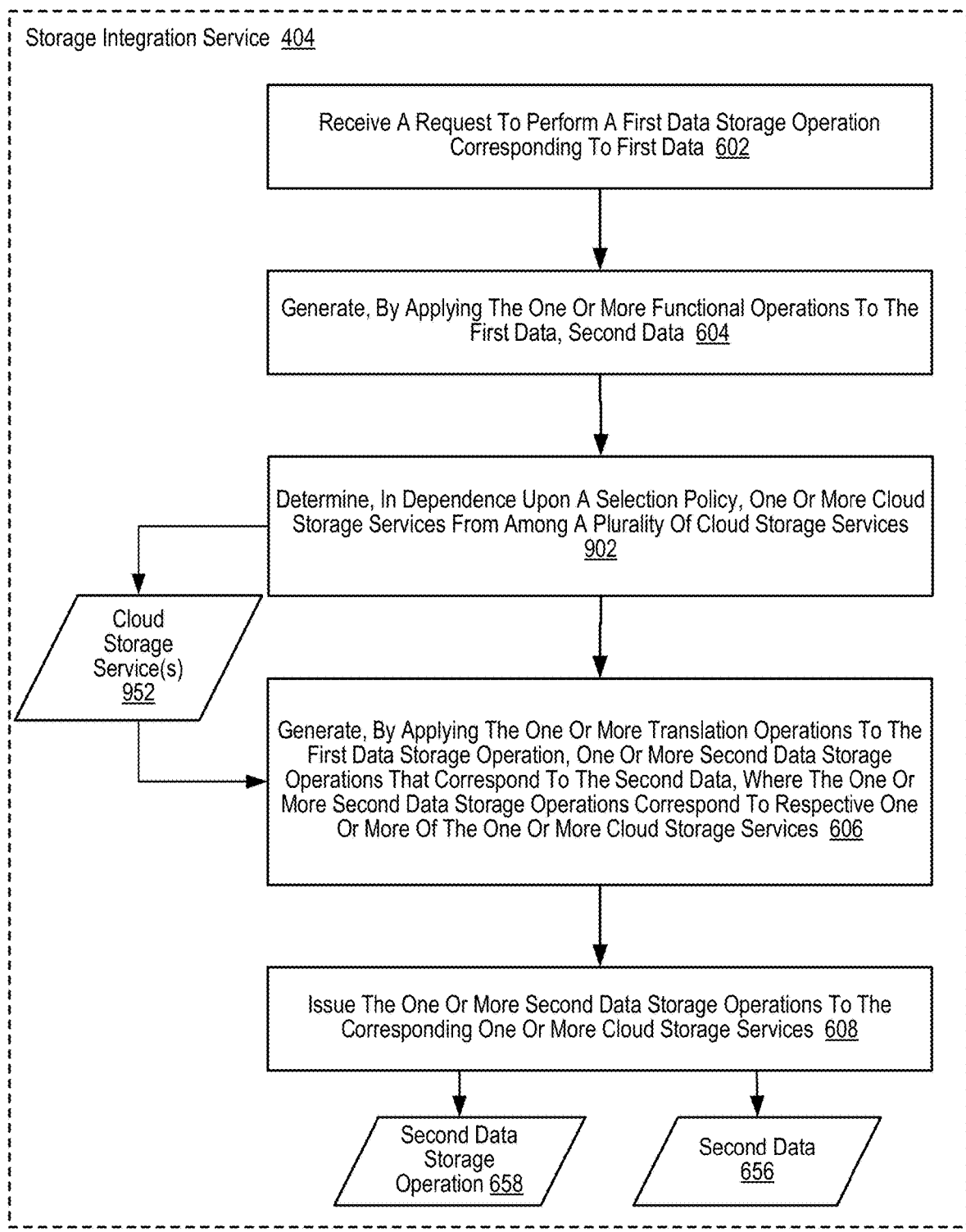
FIG. 9 sets forth a flow chart illustrating an additional example method of integrating cloud storage services according to some embodiments of the present disclosure.

For further explanation, FIG. 9 sets forth a flow chart illustrating an example method of integration storage services in a storage integration service 404 according to some embodiments of the present disclosure. The example method depicted in FIG. 9 is similar to the example method depicted in FIG. 6, as the example method depicted in FIG. 9 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 9 further includes determining (902), in dependence upon a selection policy, one or more cloud storage services 952 from among a plurality of cloud storage services.

Determining (902) the one or more cloud storage services from among the plurality of cloud storage services may be carried out by storage integration service 404 in various ways, and as discussed above with reference to FIG. 6. For example, prior to receiving (602) the request to perform the first data storage operation, a user may specify the one or more cloud storage services to use, and in this case, storage integration service 404 may determine the one or more cloud storage services that are available to the user by accessing the user-specified cloud storage services. In other examples, a user may specify a quantity of data storage to provision along with one or more data storage requirements, such as performance requirements, type of storage, reliability, security, cost, service levels, among other features—with no specification of a particular cloud storage service, and where storage integration service 404, in dependence upon the specified data storage requirements, selects one or more data storage services that meet the specified data storage requirements to be used, and are therefore determined to be available to the user for data storage operations.

Further, given a determination of available one or more cloud storage services to be used, storage integration service 404 may then determine which of the available cloud storage services to use to execute the first data operation. Storage integration service 404 may then carry out determining (902) the one or more cloud storage services from among the available cloud storage services to perform the requested first data storage operation. For example, if the first data storage operation is a write command of a segment of data, which after step (604) may be considered second data 656, then storage integration service 404 may determine which of the available one or more cloud storage services to use for storing the second data 656. Determining which of the available one or more cloud storage services to use may be carried out by storage integration service 404 applying a selection policy that is dependent upon on a load balancing scheme that may be based on a balanced distribution of I/O operations, or by storage integration service 404 applying a selection policy that is dependent upon balancing distribution of stored data among the available one or more cloud storage services, or by storage integration service 404 applying some other selection policy. For example, the selection policy may specify that a lowest cost provider of cloud storage services is to be used first, or the selection policy may specify that a highest performance storage service is to be used first, or the selection policy may be based on some default criteria, or some other user specified criteria. In this way, storage integration service 404 may carry out determining (902), in dependence upon the selection policy, the one or more cloud storage services from among a plurality of cloud storage services.

For further explanation, FIG. 10 sets forth a flow chart illustrating an example method of integration storage services in a storage integration service 404 according to some embodiments of the present disclosure. The example method depicted in FIG. 10 is similar to the example method depicted in FIG. 6, as the example method depicted in FIG. 10 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 10 further includes migrating (1002) data stored in a first cloud storage service of the one or more cloud storage services to a second cloud storage service of the one or more cloud storage services, and relinquishing (1004) the data in the first cloud storage service.

Migrating (1002) the data stored in the first cloud storage service to a second cloud storage service may be carried out by storage integration service receiving a data storage operation via service interface 406, where the data storage operation indicates a migration of data from the first cloud storage service to the second cloud storage service, where the data to be migrated may be specified in the data storage operation. While in this example, the first cloud storage service and the second cloud storage service are included within the one or more cloud storage services from steps (602)-(608), more generally, a user may specify migration from any cloud storage service on which data is stored to any other cloud storage service which may or may not currently store any user data. The data to be migrated may be specified within a data storage operation, or via a user interface input along with an indication of a data migration request, where the data to be migrated may be identified according to an offset within a specified logical volume, or where the data may be specified according to a logical or virtual address, or an identification of a block, or some other technique.

Further, migrating (1002) the data may be carried out by issuing, from storage integration service 404, a sequence of instructions that, for each portion of data to be migrated, read portions of data from the first cloud storage service and write the portions of data to the second cloud storage service. In this way, each portion of the data to be migrated is copied from the first cloud storage service to the second cloud storage service.

Relinquishing (1004) the data in the first cloud storage service may be carried out by storage integration service 404 issuing a delete, erase, or a command to invalidate a region of memory, to the first cloud storage service such that after the command is issued, the data that was migrated is no longer valid or available on the first cloud storage service.

For further explanation, FIG. 11 sets forth a flow chart illustrating an example method of integration storage services in a storage integration service 404 according to some embodiments of the present disclosure. The example method depicted in FIG. 11 is similar to the example method depicted in FIG. 6, as the example method depicted in FIG. 11 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 11 further includes provisioning (1102) a first amount of storage capacity from a first cloud storage service of the one or more cloud storage services, and providing (1104) a second amount of storage capacity to users of storage integration service 404, where the second amount of storage capacity is larger than the first amount of storage capacity provisioned from the first cloud storage service.

Provisioning (1102) a first amount of storage capacity from a first cloud storage service may be carried out by storage integration service 404, responsive to receiving data storage specifications via service interface 406 that may include a requested amount of storage, select, or using a selected, cloud storage service and requesting the first amount of storage capacity, where the first amount of storage may be different than the requested amount of storage. In other examples, storage integration service 404 may, prior to a request for storage capacity, provision and maintain a pool of data storage capacity that has been provisioned from one or more cloud storage services, where a request from a user for storage capacity may be satisfied by allocating a quantity of storage capacity from the pool of storage capacity. Further, the storage integration service 404 request for storage capacity from the selected cloud storage service may further specify one or more requirements or characteristics based on the data storage specifications received via service interface 406.

In this example, the first amount of storage provisioned by storage integration service 404, and more generally any given provisioned amount of storage, may be less than a storage capacity made available to users, where the difference between the given provisioned amount of storage capacity and a given requested amount of storage capacity may be dependent upon a reduction factor determined according to an expected amount of size reduction in stored data. Further, the expected amount of size reduction in stored data may be dependent upon the application of one or more functions for reducing, or compressing, data. In this example, given a provisioned first amount of storage capacity by storage integration service 404, storage integration service 404 may then present some other amount of available storage capacity to a user.

Providing (1104) a second amount of storage capacity to users of the storage integration service 404, where the second amount of storage capacity is larger than the first amount of storage capacity, may be carried out using different techniques. In one technique, storage integration service 404 may not disclose an amount of storage capacity provisioned from cloud storage services being integrated, and instead storage integration service 404 presents, or provides, an indication of a maximum amount of storage capacity for use, where the indicated maximum amount may be larger than the provisioned storage capacity. Using another technique, storage integration service 404 may present, as a feature of storage integration service 404 via the service interface 406, an option to provision a first amount of storage capacity and to have a second, larger amount, of storage capacity available for use, or for resale. However, in either of these techniques, the provided second amount of storage capacity available to users may be larger than the provisioned amount of storage capacity. As described above, both with reference to FIG. 11 and FIGS. 4A and 4B, the difference between the given provisioned amount of storage capacity and a given requested amount of storage capacity may be dependent upon a reduction factor determined according to an expected amount of size reduction in stored data. For example, if, after application of a data compression function to received data for writing, the compressed data is half the size of the received data, then storage integration service 404 may provision 500 MB for every 1 GB of data requested without any expectation of having insufficient storage capacity. More generally, given an expected reduction factor dependent on expected results from the application of one or more functions to reduce the size of data, storage integration service 404 may determine, or calculate, an amount of storage capacity that may be made available to users for each given provisioned amount of storage capacity. In other examples, storage integration service 404 may provision a given storage capacity and satisfy storage requests from multiple, different users.

For further explanation, FIG. 12 sets forth a flow chart illustrating an example method of integration storage services in a storage integration service 404 according to some embodiments of the present disclosure. The example method depicted in FIG. 12 is similar to the example method depicted in FIG. 6, as the example method depicted in FIG. 12 also includes: receiving (602) a request to perform a first data storage operation corresponding to first data; generating (604), by applying one or more functional operations to the first data, second data; generating (606), by applying one or more translation operations to the first data storage operation, one or more second data storage operations that correspond to the second data, where the one or more second data storage operations correspond to respective one or more cloud storage services; and issuing (608) the one or more second data storage operations to the corresponding one or more cloud storage services.

However, the example method depicted in FIG. 12 further includes: receiving (1202), by storage integration service 404, a request to perform a read operation corresponding to the first data; generating (1204), by applying one or more translation operations to the read operation, one or more read operations 1252 that correspond to the respective one or more cloud storage services; issuing (1206), by storage integration service 404, the one or more read operations 1252 to the corresponding one or more cloud storage services; and providing (1208), responsive to the read operation received, data 1258 based on one or more results 1256 from the one or more read operations 1252 issued to the one or more cloud storage services.

Receiving (1202) a request to perform a read operation corresponding to the first data may be carried out by storage integration service 404 receiving the request via service interface 406 from a given client device, where as discussed above with reference to FIG. 6, the first data has previously been stored among the one or more cloud storage services.

Generating (1204), by applying the one or more translation operations, the one or more read operations that correspond to the respective one or more cloud storage services may be carried out similarly to generating (606) the one or more second data storage operations discussed above with reference to FIG. 6. For example, generating (1204) the one or more read operations may be carried out by determining which one or more cloud storage services to be used, and determining a mapping, or translation, between the read operation received and respective, corresponding, read operations according to formats and protocols for the respective one or more cloud storage services on which the requested data is stored. For example, storage integration service 404 may keep a log that includes a respective entry for respective segments of data, where the log may be indexed according to addressing information for a segment of data, and where the log entry may include metadata indicating the one or more cloud storage services storing the segment of data, including which portion of a given segment is stored on which of the one or more cloud storage services. Further, the metadata for a given portion of data may include addressing information for referencing the given portion on a cloud storage service storing the given portion. In this way, the log may serve as a translation mechanism for translating addressing information for a received segment of data to be stored into a set of addressing information describing addressing information for multiple portions of the segment of data, or multiple portions of the transformed data, stored across different cloud storage services.

Issuing (1206), by storage integration service 404, the one or more read operations 1252 to the corresponding one or more cloud storage services may be carried out similarly to issuing (608) the one or more data storage operations to corresponding one or more cloud storage services described above with reference to FIG. 6. For example, issuing (1206) may be carried out by storage integration service 404 transmitting over a network, to each of the one or more cloud storage services storing the requested data, a read operation that corresponds to a generated read operation for a corresponding cloud storage service. Storage integration service 404 may then aggregate read results 1256 from each of the issued operations.

Providing (1208) data 1258, which is based on the one or more results 1256 from one or more read operations issued to the one or more cloud storage services, may be carried out by storage integration service 404 aggregating read results 1256 and applying the inverse of each of the functional modules applied prior to the data being stored among the one or more cloud storage services to generate read data 1258. In some examples, storage integration service 404 may maintain a log of each functional module applied for each given write operation of a given segment of data, and then apply the inverse of each functional module applied on the read results. In other examples, storage integration service 404 may apply the same set of functional modules to data for each write operation, and then apply the inverse of the same set of function modules without any log. For example, if a particular compression technique implemented by a particular function module were applied prior to writing data, then a particular decompression method that is the inverse of the particular compression technique is applied when reading the data, and similarly for other functions applied to data prior to storing the data.

Figure 13:
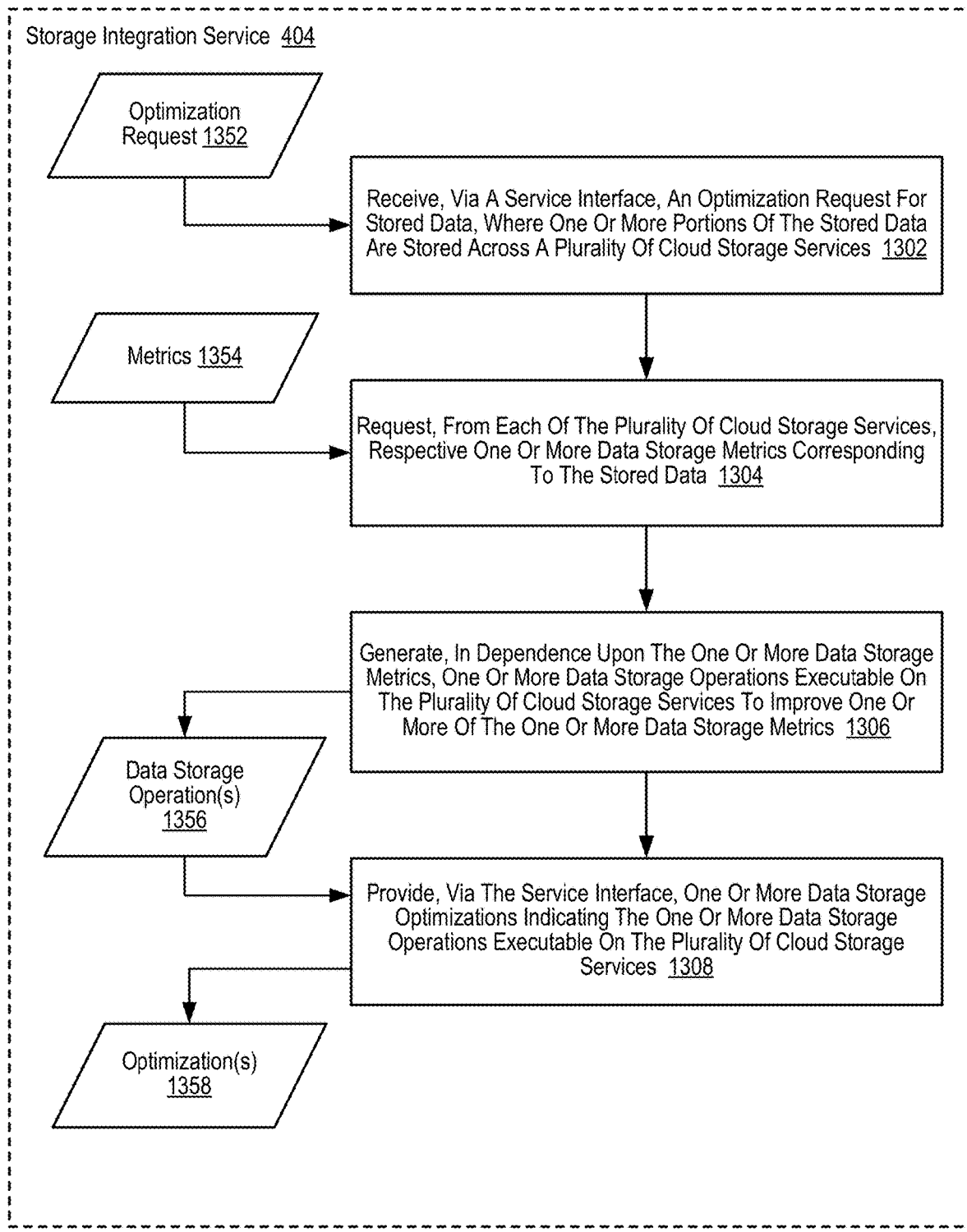
FIG. 13 sets forth a flow chart illustrating an additional example method of integrating cloud storage services according to some embodiments of the present disclosure.

For further explanation, FIG. 13 sets forth a flow chart illustrating an example method of integration storage services in a storage integration service 404 according to some embodiments of the present disclosure. Although depicted in less detail, the storage integration service 404 may implement data storage features described above with reference to FIGS. 1A-1D, FIGS. 2A-2G, and FIG. 3 as storage integration service 404 may include some or all of the components described above—in addition to integrating and augmenting cloud storage services from multiple cloud storage services. For example, using service interface 404, a client device may access or initiate any of the data storage operations described above with regard to FIGS. 1A-1D and FIGS. 2A-2G, where those data storage operations are implemented by storage integration service 404, one or more cloud storage services being integrated, or a combination of storage integration service 404 and the one or more cloud storage services being integrated. Further, the storage integration service depicted in FIG. 13 may include the same, fewer, or additional components as the storage systems described above.

The example method depicted in FIG. 13 includes receiving (1302), via service interface 406, an optimization request for stored data, where one or more portions of the stored data are stored across a plurality of cloud storage services. Receiving (1302) the optimization request may be carried out by storage integration service 404 receiving a message at one of one or more access points implemented by service interface 406, depicted in FIGS. 4 and 5, from a client device 450, where the message is transmitted across network 452. For example, storage integration service 404 may provide, via service interface 404, a user interface depicting a layout including one or more of: menu options, selection boxes, wizards, a chatbot option, or a command line interface. In this example, selection of a given user interface element may correspondingly generate an optimization request. Further, in this example, the optimization request is received subsequent to a user requesting data storage capacity and storing data, where the data, or a transformed version of the data, is distributed among the plurality of cloud storage services.

The example method depicted in FIG. 13 also includes requesting (1304), from each of the plurality of cloud storage services, respective one or more data storage metrics 1354 corresponding to the stored data. Requesting (1304) the respective one or more data storage metrics may be carried out by storage integration service 404 generating a respective status request to each respective cloud storage service according to a format and interface call for the respective cloud storage service, and transmitting over a network, to each of the plurality of cloud storage services, the respective, generated status request. The status request may specify a request for performance metrics, service issues, storage costs, changes in storage costs, trending metrics, among other measurable indicators pertaining to the stored data on that particular cloud storage service.

The example method depicted in FIG. 13 also includes generating (1306), in dependence upon the one or more data storage metrics 1354, one or more data storage operations executable on the plurality of cloud storage services to improve one or more of the one or more data storage metrics 1354. Generating (1306) the one or more data storage operations may be carried out by storage integration service 404 comparing corresponding metrics among the received one or more data storage metrics to generate a ranking of cloud storage services according to particular metrics, and to identify data storage operations that, when executed, reduce one or more of the data storage metrics. For example, given a ranking of cloud storage services for a metric that measures data storage cost, where the ranking indicates that a first cloud storage service provides storage at a lower cost than a second cloud storage service, storage integration service 404 may determine that migrating data from the second cloud storage service to the first cloud storage service would reduce a cost metric, then the generated one or more data storage operations would include data storage operations for implementing a migration of data. An example of data storage operations implementing migration of data is described above with reference to FIG. 10. Similarly, if a given metric of the received one or more data storage metrics related to I/O operation throughput, and a third cloud storage service has higher I/O throughput than a fourth cloud storage service, then storage integration service 404 may determine that a migration of all or part of the stored data on the fourth cloud storage service to the third cloud storage service would increase the I/O operation throughput metric, where in the case that less than all of the data is recommended for migration, the portion that is identified may be identified based on being accessed more frequently than the other portion of stored data. More generally, for other metrics of the received one or more data storage metrics, based on the ranking of cloud storage services, data storage operations may be generated that result in an improvement of that metric based on executing those data storage operations on one or more of the plurality of cloud storage services.

In other examples, multiple metrics may be considered in the aggregate. For example, if storage integration service 404 determines that moving data from one cloud storage service would reduce a cost metric, but increase an I/O throughput metric, or reliability metric, or some other metric, then storage integration service 404 may generate an overall optimization score that is dependent on total increases and decreases among multiple metrics, where each metric may further be weighted according to a prioritization scheme that weighs some metrics higher than other metrics. For example, the prioritization scheme may weigh reliability over cost, cost over performance, or more generally, any metric may be weighed against any other metric. In this way, storage integration service 404 may determine which optimization would produce a best overall optimization score, and determine the data storage operations that implement a particular, corresponding optimization as the one or more data storage operations 1356. However, in some examples, the optimization request 1352 may specify a particular metric to improve, in which case, storage integration service 404 identifies which data storage operations improve the specified metric.

The example method depicted in FIG. 13 also includes providing (1308), via service interface 406, one or more data storage optimizations 1358 that indicate the one or more data storage operations 1356 that are executable on the plurality of cloud storage service. Providing (1308) the one or more data storage optimizations may include generating a message that describes a metric or metrics that would be reduced if the indicated one or more data storage operations 1356 were implemented. In the example where optimization request 1352 specifies a particular metric to improve, storage integration service 404 may instead generate a message that describes that if data storage operations 1356 are implemented, then the particular metric would be improved. In either case, storage integration service 404 may further provide the user with user interface element via service interface 406, such as an "IMPLEMENT" button, to implement the optimization.

Readers will appreciate that although the many of the examples depicted in the Figures described above relate to various embodiments of the present disclosure, other embodiments are well within the scope of the present disclosure. In particular, steps depicted in one figure may be combined with steps depicted in other figures to create permutations of the embodiments expressly called out in the figures. Readers will further appreciate that although the example methods described above are depicted in a way where a series of steps occurs in a particular order, no particular ordering of the steps is required unless explicitly stated.

Example embodiments are described largely in the context of a fully functional computer system for migrating applications executing on a storage system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   receiving, by a storage integration service, a request for the storage integration service to provide a first amount of storage space for storage of first data of a first size within one or more of a plurality of cloud storage services that include a first cloud storage service provided by a first cloud services provider and a second cloud storage service provided by a second cloud services provider;
   determining, based on a data type for the first data and a source entity for the first data, a plurality of data reduction operations to apply to the first data, wherein the plurality of data reduction operations include at least data deduplication and data compression;
   generating second data of a second size by applying the data reduction operations to the first data, wherein the second size is smaller than the first size;
   selecting, in dependence upon a selection policy, the first cloud storage service and the second cloud storage service from among the plurality of cloud storage services;
   provisioning, for storage of the second data, a second amount of storage space that is less than the first amount of storage space that was requested to be provided, including provisioning first data storage resources provided by the first cloud storage service and second data storage resources provided by the second cloud storage service and including provisioning the second amount of storage space based on a data reduction factor determined based on the first size and the second size; and
   issuing, by the storage integration service, one or more requests to store a first portion of the second data at the first cloud storage service and one or more requests to store a second portion of the second data to the second cloud storage service.

2. The method of claim 1, wherein generating the second data further comprises encrypting the second data.

3. The method of claim 1, wherein the request to store the source data is carried out as part of: a write operation, a request to create a snapshot, or a request to clone data.

4. The method of claim 1, further comprising:
   migrating data stored in a first cloud storage service of the one or more cloud storage services to a second cloud storage service of the one or more cloud storage services; and
   relinquishing the data in the first cloud storage service.

5. The method of claim 1, further comprising:
   provisioning a first amount of storage capacity from two or more cloud storage services; and
   providing a second amount of storage capacity to users of the storage integration service, wherein the second amount of storage capacity is larger than the first amount of storage capacity provisioned from the two or more cloud storage services, by providing a logical address space to users that is larger than a physical address space of the provisioned first amount of storage capacity.

6. The method of claim 1, further comprising:
   receiving, by the storage integration service, a request to perform a read operation corresponding to the source data;
   generating, by applying one or more translation operations to the read operation, one or more read operations that correspond to the respective cloud storage services;
   issuing, by the storage integration service, the one or more read operations to the corresponding cloud storage services; and providing, responsive to the read operation, one or more results from the one or more read operations issued to the cloud storage services.

7. An apparatus that includes a computer processor and a computer memory, the computer memory including computer program instructions that, when executed by the computer processor, cause the computer processor to carry out the steps of:

receiving, by a storage integration service, a request for the storage integration service to provide a first amount of storage space for storage of first data of a first size within one or more of a plurality of cloud storage services that include a first cloud storage service provided by a first cloud services provider and a second cloud storage service provided by a second cloud services provider;

determining, based on a data type for the first data and a source entity for the first data, a plurality of data reduction operations to apply to the first data, wherein the plurality of data reduction operations include at least data deduplication and data compression; generating second data of a second size by applying the data reduction operations to the first data, wherein the second size is smaller than the first size;

selecting, in dependence upon a selection policy, the first cloud storage service and the second cloud storage service from among the plurality of cloud storage services;

provisioning, for storage of the second data, a second amount of storage space that is less than the first amount of storage space that was requested to be provided, including provisioning first data storage resources provided by the first cloud storage service and second data storage resources provided by the second cloud storage service and including provisioning the second amount of storage space based on a data reduction factor determined based on the first size and the second size; and issuing, by the storage integration service, one or more requests to store a first portion of the second data at the first cloud storage service and one or more requests to store a second portion of the second data to the second cloud storage service.

8. The apparatus of claim 7, wherein generating the second data further comprises encrypting the second data.

9. The apparatus of claim 7, wherein the request to store the source data is carried out as part of: a write operation, a request to create a snapshot, or a request to clone data.

* * * * *